US008200818B2

(12) United States Patent
Freund et al.

(10) Patent No.: US 8,200,818 B2
(45) Date of Patent: Jun. 12, 2012

(54) SYSTEM PROVIDING INTERNET ACCESS MANAGEMENT WITH ROUTER-BASED POLICY ENFORCEMENT

(75) Inventors: Gregor Paul Freund, San Francisco, CA (US); Keith Allan Haycock, San Francisco, CA (US); Conrad Kamaha'o Herrmann, Oakland, CA (US)

(73) Assignee: Check Point Software Technologies, Inc., Redwood City, CA (US)

( * ) Notice: Subject to any disclaimer, the term of this patent is extended or adjusted under 35 U.S.C. 154(b) by 3386 days.

(21) Appl. No.: 09/944,057

(22) Filed: Aug. 30, 2001

(65) Prior Publication Data

US 2003/0055962 A1 Mar. 20, 2003

Related U.S. Application Data

(60) Provisional application No. 60/303,653, filed on Jul. 6, 2001, provisional application No. 60/308,498, filed on Jul. 27, 2001.

(51) Int. Cl.
*G06F 15/173* (2006.01)
*G06F 15/16* (2006.01)

(52) U.S. Cl. ......... 709/225; 709/203; 709/224; 709/229

(58) Field of Classification Search .................. 709/217, 709/225, 244, 203, 229, 232
See application file for complete search history.

(56) References Cited

U.S. PATENT DOCUMENTS

| 4,914,586 | A | 4/1990 | Swinehart et al. | 707/101 |
|---|---|---|---|---|
| 5,172,227 | A | 12/1992 | Tsai et al. | 358/133 |
| 5,412,427 | A | 5/1995 | Rabbani et al. | 348/394 |
| 5,475,817 | A | 12/1995 | Waldo et al. | 709/316 |
| 5,586,260 | A | 12/1996 | Hu | 713/201 |
| 5,623,601 | A | 4/1997 | Vu | 713/201 |
| 5,652,621 | A | 7/1997 | Adams, Jr. et al. | 348/272 |
| 5,682,152 | A | 10/1997 | Wang et al. | 341/50 |
| 5,745,701 | A | 4/1998 | Nguyen-Thai et al. | 709/249 |
| 5,754,227 | A | 5/1998 | Fukuoka | 348/232 |
| 5,761,683 | A * | 6/1998 | Logan et al. | 715/513 |
| 5,764,887 | A | 6/1998 | Kells et al. | 713/200 |
| 5,798,794 | A | 8/1998 | Takahashi | 348/398 |

(Continued)

*Primary Examiner* — Kamal Divecha
(74) *Attorney, Agent, or Firm* — John A. Smart

(57) ABSTRACT

A computing environment with methods for monitoring access to an open network such as the Internet, is described. The system includes one or more client computers, each operating applications (e.g., Netscape Navigator or Microsoft Internet Explorer) requiring access to an open network, such as a WAN or the Internet, and a router or other equipment that serves a routing function (e.g., a cable modem) for the client computers. A centralized security enforcement module on the router maintains access rules for the client computers and verifies the existence and proper operation of a client-based security module on each client computer. The router-side security module periodically sends out a router challenge via Internet broadcast to the local computers on the network. If the client-side security module is installed and properly operating, the client-side security module responds to the router challenge. The responses received by the router-side security module are maintained in a table. Each time the router receives a request from a client computer to connect to the Internet, the router-side security module reviews the table and analyzes whether or not the computer requesting a connection to the Internet properly responded to the most recent router challenge. If it determines that the computer has properly responded to the router challenge, then it permits the computer to connect to the Internet. If a computer has not properly responded or if a computer has not answered the router challenge, then the computer is not allowed to connect to the Internet as requested.

59 Claims, 9 Drawing Sheets

U.S. PATENT DOCUMENTS

| | | | |
|---|---|---|---|
| 5,815,574 A | 9/1998 | Fortinsky | 713/153 |
| 5,818,525 A | 10/1998 | Elabd | 348/268 |
| 5,828,833 A | 10/1998 | Belville et al. | 713/201 |
| 5,832,211 A | 11/1998 | Blakley et al. | 713/202 |
| 5,838,903 A | 11/1998 | Blakely et al. | 713/202 |
| 5,848,193 A | 12/1998 | Garcia | 382/232 |
| 5,857,191 A | 1/1999 | Blackwell et al. | 707/10 |
| 5,864,665 A | 1/1999 | Tran | 713/201 |
| 5,875,296 A | 2/1999 | Shi et al. | 713/202 |
| 5,881,230 A | 3/1999 | Christensen et al. | 709/203 |
| 5,907,610 A | 5/1999 | Onweller | 379/242 |
| 5,913,088 A | 6/1999 | Moghadam et al. | 396/311 |
| 5,917,542 A | 6/1999 | Moghadam et al. | 348/207 |
| 5,926,105 A | 7/1999 | Wakamatsu | 370/401 |
| 5,950,195 A * | 9/1999 | Stockwell et al. | 707/4 |
| 5,974,470 A * | 10/1999 | Hammond | 719/331 |
| 5,983,270 A * | 11/1999 | Abraham et al. | 709/224 |
| 5,987,611 A | 11/1999 | Freund | 713/201 |
| 6,008,847 A | 12/1999 | Bauchspies | 348/391 |
| 6,026,440 A * | 2/2000 | Shrader et al. | 709/224 |
| 6,028,807 A | 2/2000 | Awsienko | 365/230.02 |
| 6,064,437 A | 5/2000 | Phan et al. | 348/446 |
| 6,088,450 A * | 7/2000 | Davis et al. | 713/182 |
| 6,091,777 A | 7/2000 | Guetz et al. | 375/240 |
| 6,125,201 A | 9/2000 | Zador | |
| 6,154,493 A | 11/2000 | Acharya et al. | 375/240.19 |
| 6,167,438 A | 12/2000 | Yates et al. | 709/216 |
| 6,243,420 B1 | 6/2001 | Mitchell et al. | 375/240.18 |
| 6,247,062 B1 | 6/2001 | Sarkar | 709/245 |
| 6,249,820 B1 | 6/2001 | Dobbins et al. | 709/238 |
| 6,269,099 B1 | 7/2001 | Borella et al. | 370/389 |
| 6,304,973 B1 | 10/2001 | Williams | 713/201 |
| 6,327,652 B1 * | 12/2001 | England et al. | 713/2 |
| 6,330,588 B1 * | 12/2001 | Freeman | 709/202 |
| 6,356,929 B1 | 3/2002 | Gall et al. | 709/201 |
| 6,393,484 B1 | 5/2002 | Massarani | 709/227 |
| 6,438,612 B1 | 8/2002 | Ylonen et al. | 709/249 |
| 6,463,474 B1 * | 10/2002 | Fuh et al. | 709/225 |
| 6,542,933 B1 * | 4/2003 | Durst et al. | 709/229 |
| 6,594,483 B2 * | 7/2003 | Nykanen et al. | 455/411 |
| 6,606,708 B1 | 8/2003 | Devine et al. | 713/201 |
| 6,665,285 B1 * | 12/2003 | Treadaway et al. | 370/338 |
| 6,697,944 B1 * | 2/2004 | Jones et al. | 713/168 |
| 6,721,555 B1 * | 4/2004 | Phillips et al. | 455/411 |
| 6,996,841 B2 * | 2/2006 | Kadyk et al. | 726/12 |
| 7,145,898 B1 * | 12/2006 | Elliott | 370/352 |

* cited by examiner

SYSTEM PROVIDING INTERNET ACCESS MANAGEMENT WITH ROUTER-BASED POLICY ENFORCEMENT

RELATED APPLICATIONS

The present application is related to and claims the benefit of priority of the following commonly-owned provisional application(s): application Ser. No. 60/303,653, filed Jul. 6, 2001, entitled "System Providing Internet Access Management with Router-based Policy Enforcement", of which the present application is a non-provisional application thereof. The present application is related to the following commonly-owned provisional application(s): application Ser. No. 60/308,498, filed Jul. 27, 2001, entitled "Automatic Local Network Discovery and Firewall Reconfiguration Methodology for a Mobile Computing Device". The disclosures of each of the foregoing applications are hereby incorporated by reference in their entirety, including any appendices or attachments thereof, for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates generally to information processing and, more particularly, to system and methods for regulating access and maintaining security of individual computer systems and Local Area Networks (LANs) connected to larger open networks (Wide Area Networks or WANs), including the Internet.

2. Description of the Background Art

The first computers were largely stand-alone units with no direct connection to other computers or computer networks. Data exchanges between computers were mainly accomplished by exchanging magnetic or optical media such as floppy disks. Over time, more and more computers were connected to each other using Local Area Networks ("LANs"). In both cases, maintaining security and controlling what information a computer user could access was relatively simple because the overall computing environment was limited and clearly defined.

With the ever-increasing popularity of the Internet, particularly the World Wide Web ("Web") portion of the Internet, however, more and more computers are connected to larger networks. Providing access to vast stores of information, the Internet is typically accessed by users through Web "browsers" (e.g., Microsoft Internet Explorer or Netscape Navigator) or other Internet applications. Browsers and other Internet applications include the ability to access a URL (Universal Resource Locator) or Web site. In the last several years, the Internet has become pervasive and is used not only by corporations, but also by a large number of small business and individual users for a wide range of purposes. As a result, the Internet is a highly diversified environment that is regularly used by both large organizations with significant technical resources as well as by small businesses and individual users with very limited technical resources and skills.

As more and more computers are now connected to the Internet, either directly (e.g., over a dial-up or broadband connection with an Internet Service Provider or "ISP") or through a gateway between a LAN and the Internet, a whole new set of challenges face LAN administrators and individual users alike: these previously closed computing environments are now open to a worldwide network of computer systems. Specific challenges, for example, include the following: (1) attacks by perpetrators (hackers) capable of damaging the local computer systems, misusing those systems, or stealing proprietary data and programs; (2) unauthorized access to external data (e.g., pornographic or other unsuitable Web sites); (3) infiltration by viruses and "Trojan horse" programs; (4) employee abuse of business computer resources for unauthorized personal activities (e.g., game playing); and (5) hording available network bandwidth through the use of bandwidth-intensive applications (e.g., real-time audio programs).

The software industry has, in response, introduced a number of products and technologies to address and minimize these threats, including "firewalls," proxy servers, and similar technologies—all designed to keep outside hackers from penetrating a corporate LAN or a personal computer. Firewalls are applications that intercept the data traffic at the gateway to a Wide Area Network ("WAN") and check the data packets (i.e., Internet Protocol packets or "IP packets") being exchanged for suspicious or unwanted activities. Initially firewalls were used primarily to keep intruders from the LAN by filtering data packets. Subsequently, the firewall concept was expanded to include "Stateful Inspection". Here, a firewall not only looks at the IP packets but also inspects the data packets' transport protocol (e.g., TCP) header (and even the application level protocols) in an attempt to better understand the exact nature of the data exchange.

Proxy server or application gateways, on the other hand, are LAN server based applications that act on behalf of the client application. Prior to accessing the Internet, the application submits a request to the proxy server, which inspects the request for unsafe or unwanted traffic. Only after this inspection will the proxy server consider forwarding the request to the destination on the Internet.

Firewalls and proxy servers (or application gateways) are based on a centralized filter mechanism, with most of the filtering work being performed at the server (as opposed to being performed at the individual client computers). Such an approach is problematic. Because of the centralized nature of firewalls and proxy servers, each approach extracts significant performance penalties. During operation of a typical system employing either approach, a single server might have to do the filtering work for hundreds or even thousands of PCs or workstations. This creates a major bottleneck affecting overall system performance. Further, a centralized filter poses a significant bottleneck even when the client computers are idly awaiting data. As emerging technologies on the Internet require still faster data delivery (e.g., real-time audio and video feeds) and use more complex protocols, this problem will likely be exacerbated. In the case of firewalls employing "Stateful Inspection" technology, performance problems are aggravated by the fact that the firewall software needs to duplicate much of the protocol implementation of the client application as well as the transport protocol (e.g., TCP and UDP protocol) in order to understand the data flow.

Centralized filter architectures also miss vital information that is necessary to correctly interpret the data packets because the underlying protocols were designed for effective data transfer and not for data monitoring and interception. For instance, monitoring based on an individual client application is not supported, despite the fact that two identical data packets (or series of data packets) can have completely different meanings based on the underlying context—that is, how the client application actually interprets the data packets. As a result, computer viruses or Trojan horse applications can camouflage data transmissions as legitimate traffic.

There are still other disadvantages to centralized filtering. These centralized filters are usually difficult to configure and administer. The task of setting up different rights for different users, workstations, or workgroups, for instance, is particularly difficult. Also, a centralized filter cannot distinguish between "active" use of the Internet (i.e., when user interaction with a personal computer ("PC") causes the Internet access) and "background" use (i.e., when an application accesses the Internet without user interaction). Still further, a centralized filter is easily circumvented, for example by a user employing a modem for establishing a dial-up connection to an ISP. Similarly, the proxy-server approach requiring special versions or specialized configurations of client applications is unattractive because of the resulting system administration complications. Internet setup for PCs employed at remote locations is particularly complicated.

As a result, these centralized approaches are suitable for only larger organizations that are able to dedicate significant resources towards deployment and management of these complex centralized firewalls, proxies and other security systems. At the other end of the spectrum, many small business and home users have neither the equipment nor the expertise to deploy and manage sophisticated security systems to protect the information they maintain on LANs or individual computers that are connected to the Internet.

Moreover, in recent years an increasingly large number of small business and individual users use a broadband connection to the Internet (e.g., DSL or cable modem) to facilitate quicker viewing and downloading of Internet Web pages and materials. From a security standpoint this represents a significantly increased challenge as these broadband connections offer a wide channel that is typically always on and therefore always open to attack. Many users also have static IP addresses, which also makes these users a more obvious and easier target for repeated attack by a hacker. Adding to this threat is the fact that the vast majority of small business, home office and other individual users are using Microsoft Windows operating systems and application programs, which contain a number of well-known security holes.

In response to these security threats facing small business and individual users, a number of companies have developed personal firewall products, which act as a limited and static form of security against external attacks initiated by third parties. However, the first generation of personal firewall products were very difficult to deploy and operate. They also provided only a relatively static wall of protection against unauthorized intrusion. In order for these personal firewall programs to provide an increased level of protection, they had to be properly configured. Unfortunately, proper configuration and operation of these programs required significant technical knowledge. Thus, even if deployed, these personal firewall products provided only limited protection to the majority of users.

More recently, improved end point security products, such as ZoneAlarm™ version 1.0, were made available to provide corporate, small business and home users with both more sophisticated protection as well as a product that is easier to deploy and operate. This end point security product provides enhanced security by expressly seeking authorization from an administrator (or alternatively from the individual user) for each Internet connection, including Internet connections initiated on the user's own computer, from within the LAN, or from external sources. This enables the LAN administrator to monitor what applications each user is utilizing and enforces security by obtaining specific authorization for each Internet connection initiated internally or externally. Alternatively, in the home environment, this enables the home user to monitor the applications he or she is using and enforces security by requiring his or her specific authorization for each Internet connection initiated internally or externally. This product disallows any Internet connection that has not been explicitly authorized by the administrator or user. Further description of this prior ZoneAlarm™ product may be found in commonly-owned U.S. application Ser. No. 08/851,777, filed May 6, 1997, now U.S. Pat. No. 5,987,611, issued Nov. 16, 1999, the disclosure of which is incorporated by reference.

ZoneAlarm™ provides increased protection against malicious code that runs on the user's computer and sends data out from the user's computer to third parties. Earlier personal firewall products (e.g., SonicWALL) did not monitor what applications the user was running on his or her machine and therefore provided little or no protection against this kind of outgoing data theft. The ZoneAlarm™ product is also easier to deploy and operate than earlier personal firewall products because it does not require significant knowledge about Internet protocols and other technical matters.

Despite these improvements, three principal security issues remain to be resolved. First, in a LAN serving a corporation, small business or other organization there is a strong interest in ensuring that every machine connected to the LAN implements a minimum level of security to protect the overall security of the network. However, in the typical LAN serving small organizations the operations of every machine connected to the LAN are usually not closely monitored or centrally controlled. Typically in these smaller networks the machines are not tightly managed because small organizations do not have large information technology departments to establish and enforce common security and operational procedures. Also, even if appropriate security software is deployed, security may be at risk when one or more users inadvertently or intentionally disables his or her security software. For example, an user may inadvertently disable previously installed security software in the process of upgrading his or her operating system. A user might also intentionally disable his or her security software if he or she believed that the security software was causing a problem or delaying his or her operation of a particular application. When the security of the local network depends upon voluntary compliance by each user with appropriate security standards and procedures, there is a strong interest in enforcing a minimum level of compliance to ensure that every user has loaded and is running appropriate security software to protect his or her machine and the local network.

Second, in the same way that a single user can jeopardize the security of a network, a Trojan horse program can cause similar damage. In certain cases a user may receive and inadvertently run malicious code that is intentionally designed to avoid established virus filtering programs. Even with proper use of current virus detection programs, certain viruses may nonetheless avoid detection and may reside on a machine. Accordingly, there is a strong interest in finding a way to stop a piece of malicious code residing on a machine within the LAN from initiating a connection to the Internet and sending unauthorized code or data to other machines. The third and related issue to be addressed in order to facilitate security is to make it easy for users to comply with security standards and procedures. Compliance is enhanced by providing for automatic enforcement of security standards, by explaining the standards and procedures to the user, and by making it easy for the user to download and operate the required security software on his or her machine. If it is difficult or time intensive for a user to download the required software or comply with the security procedures, then he or she is more likely to resist compliance.

To date, available security products do not address these problems. Given the ever-increasing popularity of the Internet (and therefore attendant security risks), much interest exists in solving these problems.

Glossary

ARP: ARP or Address Resolution Protocol is a protocol used to convert an IP address into a physical address (called a DLC address), such as an Ethernet address. A host wishing to obtain a physical address broadcasts an ARP request on the TCP/IP network. The host on the network that has the IP address in the request then replies with its physical hardware address.

BOOTP: BOOTP is short for Bootstrap Protocol, an Internet protocol that enables a diskless workstation to discover its own IP address, the IP address of a BOOTP server on the network, and a file to be loaded into memory to boot the machine. This enables the workstation to boot without requiring a hard or floppy disk drive. The protocol is defined by RFC 951, which is incorporated herein by reference. A copy of RFC 951 is currently available at www.i-etf.org.

DHCP: DHCP or Dynamic Host Configuration Protocol is a protocol for assigning dynamic IP addresses to devices on a network. With dynamic addressing, a device can have a different IP address every time it connects to the network. In some systems, the device's IP address can even change while it is still connected. DHCP also supports a mix of static and dynamic IP addresses. Dynamic addressing simplifies network administration because the software keeps track of IP addresses rather than requiring an administrator to manage the task. This means that a new computer can be added to a network without the need to manually assign the computer a unique IP address. Many Internet Service Providers use dynamic IP addressing for dial-up users.

End point security: End point security is a way of managing and enforcing security on each computer instead of relying upon a remote firewall or a remote gateway to provide security for the local machine or environment. End point security involves a security agent that resides locally on each machine and that monitors and controls the interaction of this machine with other machines and devices that are connected on a LAN or a larger wide area network such as the Internet in order to provide security to the local machine.

HTML: HTML stands for HyperText Markup Language. Every HTML document requires certain standard HTML tags in order to be correctly interpreted by Web browsers. Each document consists of head and body text. The head contains the title, and the body contains the actual text that is made up of paragraphs, lists, and other elements. Browsers expect specific information because they are programmed according to HTML and SGML specifications. Further description of HTML documents is available in the technical and trade literature; see e.g., Ray Duncan, *Power Programming: An HTML Primer*, PC Magazine, Jun. 13, 1995, the disclosure of which is hereby incorporated by reference.

HTTP: HTTP is the acronym for "HyperText Transfer Protocol", which is the underlying communication protocol used by the World Wide Web on the Internet. HTTP defines how messages are formatted and transmitted, and what actions Web servers and browsers should take in response to various commands. For example, when a user enters a URL in his or her browser, this actually sends an HTTP command to the Web server directing it to fetch and transmit the requested Web page. Further description of HFTP is available in RFC 2616: Hypertext Transfer Protocol—HTTP/1.1, the disclosure of which is hereby incorporated by reference. RFC 2616 is available from the World Wide Web Consortium (W3), and is currently available via the Internet at http://www.w3.org/Protocols/. Additional description of H=TP is available in the technical and trade literature; see e.g., William Stallings, The Backbone of the Web, BYTE, October 1996, the disclosure of which is hereby incorporated by reference.

IP Address: IP Address is an identifier for a computer or device on a TCP/IP network. Networks using the TCP/IP protocol route messages based on the IP address of the destination. The format of an IP address is a 32-bit numeric address written as four numbers separated by periods. Each number can be zero to 255. For example, 1.160.10.240 could be an IP address. Within an isolated network, IP addresses can be assigned at random as long as each one is unique. However, connecting a private network to the Internet requires using registered IP addresses (called Internet addresses) to avoid duplicates. The four numbers in an IP address are used in different ways to identify a particular network and a host on that network.

MAC Address: Media Access Control Address or MAC Address is a hardware address that uniquely identifies each node of a network. In IEEE (Institute of Electrical and Electronics Engineers) 802 networks, the Data Link Control (DLC) layer of the OSI Reference Model is divided into two sub layers: the Logical Link Control (LLC) layer and the Media Access Control (MAC) layer. The MAC layer interfaces directly with the network media. Consequently, each different type of network media requires a different MAC layer. On networks that do not conform to the IEEE 802 standards but do conform to the OSI Reference Model, the node address is called the Data Link Control (DLC) address.

MD5: An algorithm created in 1991 by Professor Ronald Rivest that is used to create digital signatures. MD5 is a one-way hash function, thus making it nearly impossible to derive the original text or data. MD5 takes as input a message of arbitrary length and produces as output a 128-bit "fingerprint" or "message digest" of the input. It is intended for use with 32 bit machines and is safer than the MD4 algorithm. Professor Rivest's original implementation is included in an appendix to RFC 1321.

NAT: NAT or Network Address Translation is an Internet standard that enables a local-area network (LAN) to use one set of IP addresses for internal traffic and a second set of addresses for external traffic. A NAT box located where the LAN meets the Internet makes all necessary IP address translations between the LAN and the Internet. The NAT box serves two main purposes: (1) providing a type of firewall by hiding internal IP addresses; and (2) enabling a company to use more internal IP addresses. Since these internal addresses are only used internally, there is no possibility of conflict with IP addresses used by other companies and organizations.

Secure Hash Algorithm (SHA-1): This is an algorithm, specified in the Secure Hash Standard (SHS), that was developed by the National Institute of Standards and Technology (NIST). The SHA-1 calculates a Hash function for a specified text or file as a parameter. It takes a message and generates a 160-bit hash (message digest). The SHA-1 is called secure because it is computationally infeasible to find a message that corresponds to a given message digest, or to find two different messages which produce the same message digest.

SGML: SGML stands for Standard Generalized Markup Language, a system for organizing and tagging elements of a document. SGML was developed and standardized by the International Organization for Standards (ISO) in 1986. SGML itself does not specify any particular formatting; rather, it specifies the rules for tagging elements. These tags can then be interpreted to format elements in different ways.

Subnet: A subnet is a portion of a network that shares a common address component. On TCP/IP networks, subnets are defined as all devices whose IP addresses have the same prefix. For example, all devices with IP addresses that start with 100.100.100. would be part of the same subnet. Dividing a network into subnets is useful for both security and performance reasons. IP networks are divided using a subnet mask.

TCP: TCP stands for Transmission Control Protocol. TCP is one of the main protocols in TCP/IP networks. Whereas the IP protocol deals only with packets, TCP enables two hosts to establish a connection and exchange streams of data. TCP guarantees delivery of data and also guarantees that packets will be delivered in the same order in which they were sent. For an introduction to TCP, see, e.g., RFC 793, the disclosure of which is hereby incorporated by reference. A copy of RFC 793 is currently available at www.ietf.org.

TCP/IP: TCP/IP stands for Transmission Control Protocol/Internet Protocol, the suite of communications protocols used to connect hosts on the Internet. TCP/IP uses several protocols, the two main ones being TCP and IP. TCP/IP is built into the UNIX operating system and is used by the Internet, making it the de facto standard for transmitting data over networks. For an introduction to TCP/IP, see e.g., *RFC* 1180: *A TCP/IP Tutorial*, the disclosure of which is hereby incorporated by reference. A copy of RFC 1180 is currently available at ftp://ftp.isi.edu/in-notes/rfc1180.txt.

UDP: UDP stands for User Datagram Protocol, a connectionless protocol that, like TCP, runs on top of IP networks. Unlike TCP/IP, UDP/IP provides very few error recovery services, offering instead a direct way to send and receive datagrams over an IP network. UDP is used primarily for broadcasting messages over a network. For additional information on UDP, see RFC 768, the disclosure of which is hereby incorporated by reference. A copy of RFC 768 is currently available at www.ietf.org.

URL: URL is an abbreviation of Uniform Resource Locator, the global address of documents and other resources on the World Wide Web. The first part of the address indicates what protocol to use, and the second part specifies the IP address or the domain name where the resource is located.

SUMMARY OF THE INVENTION

The present invention takes advantage of the fact that a client's premises or Local Area Network typically includes an independent piece of equipment (such as a router or DSL modem) that is used to route traffic from the local machine or LAN to the Internet. With the invention, such client premises equipment can be used to regulate traffic between the local machine or LAN and the Internet, and can take action to terminate access to the Internet that is not explicitly authorized.

The system in which the present invention is embodied includes a broadband router or another piece of client premises equipment that serves a routing function for a local computer or a LAN. A router-side security module, including a client management protocol, a router compliance table, and a routing component are installed and operational on the router. One or more computers connect to the Internet through the router. A client-side security module of the present invention is installed on the local computers. In addition, a "sandbox" server is located somewhere on the Internet. Requests to connect to the Internet from non-compliant computers are redirected to the sandbox server.

The present invention involves the delegation of a small portion of the overall operation of an end point security solution to a local piece of client premises equipment (such as a router or the like). Every few seconds the security module of the present invention that is installed on the router sends out a communication referred to as a "router challenge" via Internet broadcast to the local computers on the network. The router challenge requests a response from the local computers within a few seconds. If the client-side security module of the present invention is installed and properly operating on each local computer, then the client-side security module responds to the router challenge.

The responses received by router-side security module are maintained in a table. Each time the router receives a request from a local computer to connect to the Internet, the router-side security module reviews the table and analyzes whether or not the computer requesting a connection to the Internet properly responded to the most recent router challenge. If it determines that the computer has properly responded to the router challenge, then it permits the computer to connect to the Internet. If a computer has not properly responded or if a computer has not answered the router challenge, then the computer is not allowed to connect to the Internet as requested. Instead, the non-compliant computer is redirected and permitted only a limited Internet connection to the sandbox server. In this situation, the security module only allows the non-compliant computer to access the sandbox server to perform a defined set of tasks to address the non-compliance. All other Internet access by the non-compliant computer is disabled.

DETAILED DESCRIPTION OF A PREFERRED EMBODIMENT

The following description will focus on the presently-preferred embodiment of the present invention, which is implemented in a desktop application operating in an Internet-connected environment running under a desktop operating system, such as the Microsoft® Windows running on an IBM-compatible PC. The present invention, however, is not limited to any particular one application or any particular environment. Instead, those skilled in the art will find that the system and methods of the present invention may be advantageously embodied on a variety of different platforms, including Macintosh, Linux, BeOS, Solaris, UNIX, Next-Step, FreeBSD, and the like. Therefore, the description of the exemplary embodiments that follows is for purposes of illustration and not limitation.

I. Computer-Based Implementation

A. Basic System Hardware (e.g., for Desktop and Server Computers)

Figure 1:
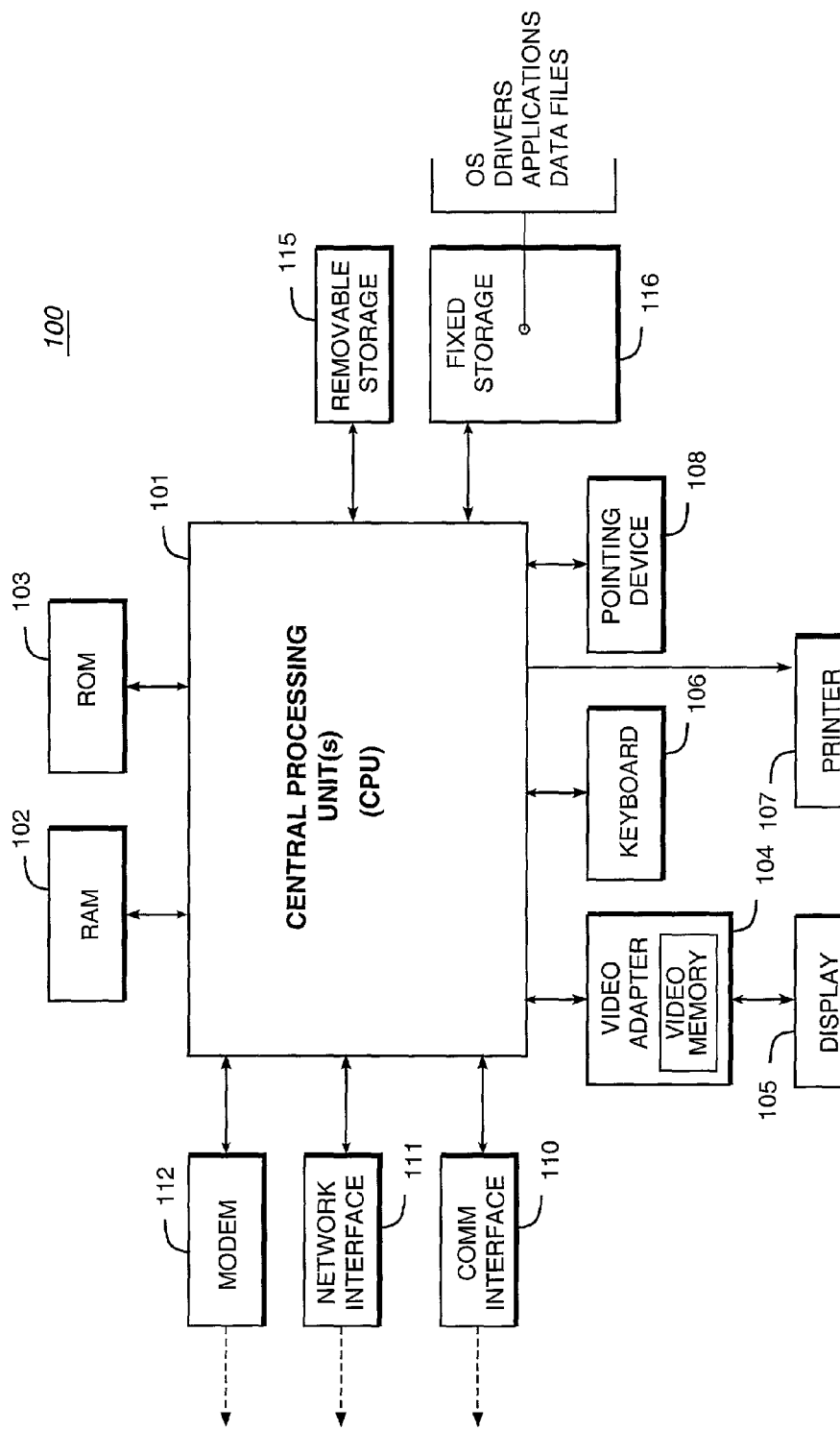
FIG. 1 is a block diagram of a computer system in which software-implemented processes of the present invention may be embodied.

The present invention may be implemented on a conventional or general-purpose computer system, such as an IBM-compatible personal computer (PC) or server computer. FIG. 1 is a very general block diagram of an IBM-compatible system 100. As shown, system 100 comprises a central processing unit(s) (CPU) or processor (s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, or the like), a fixed (mass) storage device 116 (e.g., hard disk), a communication port(s) or interface(s) 110, a modem 112, and a network interface card (NIC) or controller 111 (e.g., Ethernet). Although not shown separately, a real-time system clock is included with the system 100, in a conventional manner.

CPU 101 comprises a processor of the Intel Pentium® family of microprocessors. However, any other suitable microprocessor or microcomputer may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixteen megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115 and 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the storage device or mass storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the display device 105. Likewise, the pointing device 108, such as a mouse, track ball, pen device, or the like, permits selection and manipulation of objects on the display device (screen). In this manner, these input devices support manual user input for any process running on the system.

The computer system 100 displays text and/or graphic images and other data on the display device 105. The video adapter 104, which is interposed between the display device 105 and the system, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet® printer (available from Hewlett-Packard of Palo Alto, Calif.), for creating hard copy images of output of the system.

The system itself communicates with other devices (e.g., other computers) via the network interface card (NIC) 111 connected to a network (e.g., Ethernet network), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication ("comm") interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Compaq Computers of Houston, Tex., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

B. Basic System Software

Figure 2:
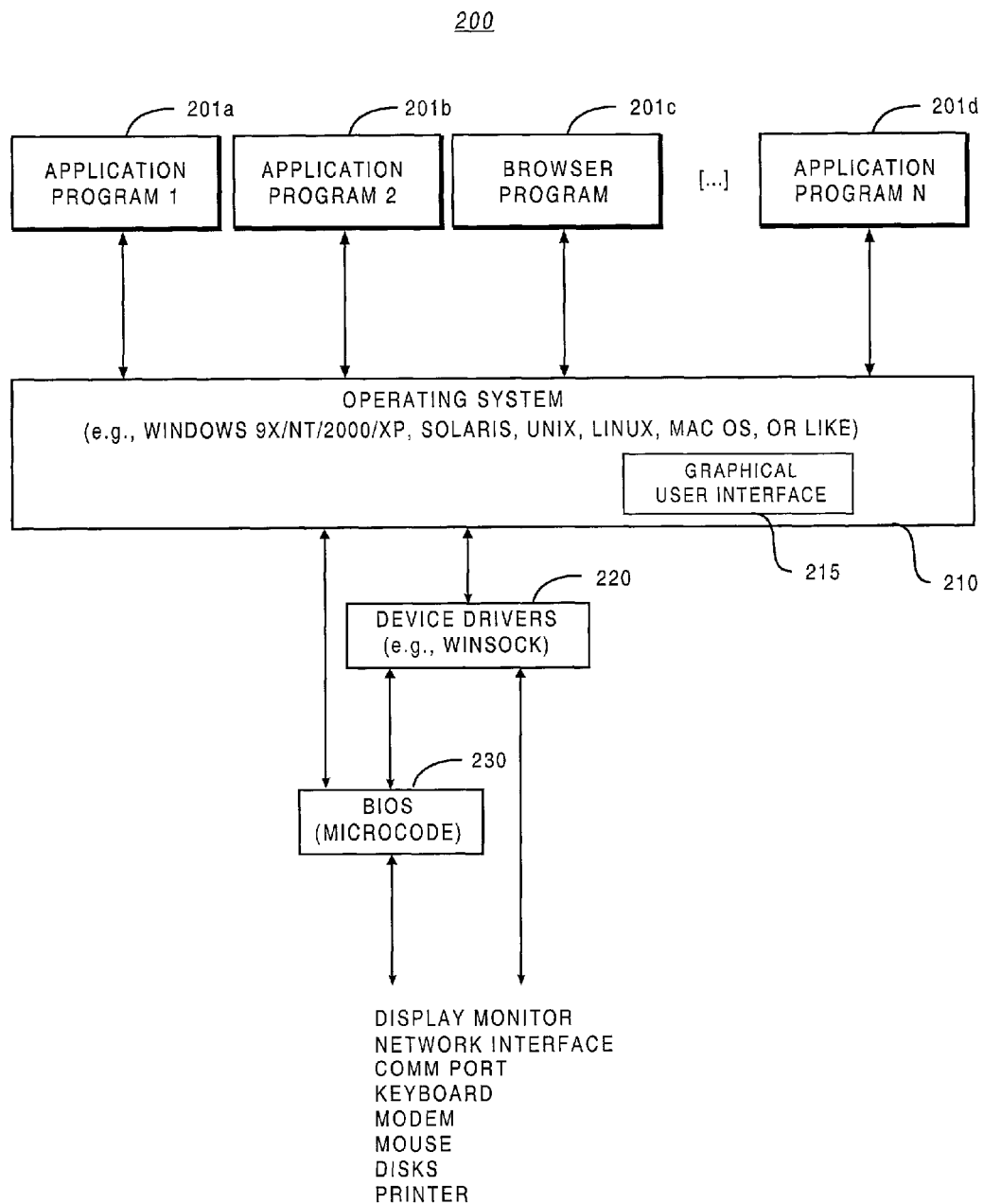
FIG. 2 is a block diagram of a software system for controlling the operation of the computer system.

Illustrated in FIG. 2, a computer software system 200 is provided for directing the operation of the computer system 100. Software system 200, which is stored in random access memory (RAM) 102 and on fixed storage device (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into random-access memory 102) for execution by the system 100.

System 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application program (s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS (microcode) 230 (i.e., ROM-based microcode), particularly when interfacing with peripheral devices. OS 210 can be provided by a conventional operating system, such as Microsoft® Windows 9x, Microsoft® Windows NT, Microsoft® Windows 2000, or Microsoft® Windows XP, all available from Microsoft Corporation of Redmond, Wash. Alternatively, OS 210 can also be an alternative operating system, such as the previously-mentioned operating systems.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., Web server) that communicates with one or more "clients" (e.g., personal computers running Web browsers such as Netscape Navigator or Microsoft Internet Explorer). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

II. System and Methods for Enforcing Security using Client Premises Equipment

A. General Design Considerations

The present invention provides a security system that delegates enforcement of certain security policies to software that is not running on a local computer but instead running on another piece of equipment on the same Local Area Network or "LAN". This serves to avoid or reduce the impact of Trojan horse or similar types of attacks from malicious code that may be running on a machine in the LAN. Because all of the software that runs on a local machine is subject to being overwritten or controlled by the malicious code that is resident on the machine, there needs to be a simple, but effective solution that resides on a different machine or device that can provide protection against this malicious code by denying it the ability to initiate a connection to a LAN or a Wide Area Network to transmit unauthorized code or data.

The security solution of the present invention includes a component that is installed on a device that resides on the client's premises or LAN ("client premises equipment") such as a router, DSL modem, cable modem, or the like. The security component on the client premises equipment serves as the traffic cop that prevents the unauthorized transfer of code or data from the local machine to a local network or a larger network such as the Internet. This eliminates one of the most serious threats to individuals and small organizations, the theft of valuable and private information residing on their computer systems.

The present invention takes advantage of the fact that a client's premises or LAN typically includes an independent piece of equipment that is used to route traffic from the local machine or LAN to the Internet. With the invention, the client premises equipment can be used to regulate traffic between the local machine or LAN and the Internet and can take action to terminate access to the Internet that is not explicitly authorized. The client premises equipment typically has limited processing capacity and system resources, consequently the security component to be used to regulate traffic needs to be simple, compact and non-intrusive so that it does not interfere with or delay the flow of data or the other primary operations handled by this equipment.

The present invention involves the delegation of a small portion of the overall operation of the end point security software to a local piece of client premises equipment (such as a router or DSL modem) to enable this separate device to enforce certain basic security rules and procedures. This router-side security component, running on the router or other piece of local client premises equipment, checks to ensure that appropriate end point security software is in place on all of the computers on the LAN. Prior to allowing a local computer to connect to the Internet, the security component on the router verifies that the computer has installed and is running appropriate security software, and is in compliance with other established security policies. If a computer is not in compliance, then the computer's access to the Internet is restricted to those activities necessary to get the computer back into compliance. This is accomplished by redirecting the attempted connection by a non-compliant computer to a designated "sandbox" server that can facilitate appropriate corrective action, including the download of appropriate software to correct the non-compliance. The security solution only permits an Internet connection to this sandbox server for the limited purpose of informing the user of the non-compliance and enabling the user to take the steps necessary to bring his or her computer into compliance. The security solution limits and denies any other access to the Internet by the non-compliant computer.

The router-side security component residing on the client premises equipment serves the limited role of enforcing security policies, including making sure that security software is installed and properly operating on all of the computers in the LAN. Most of the security functions continue to be handled on the computers in the LAN as they typically have much greater available resources (memory, processing capacity and storage) than the client premises equipment.

B. High Level Description of System

Figure 3:
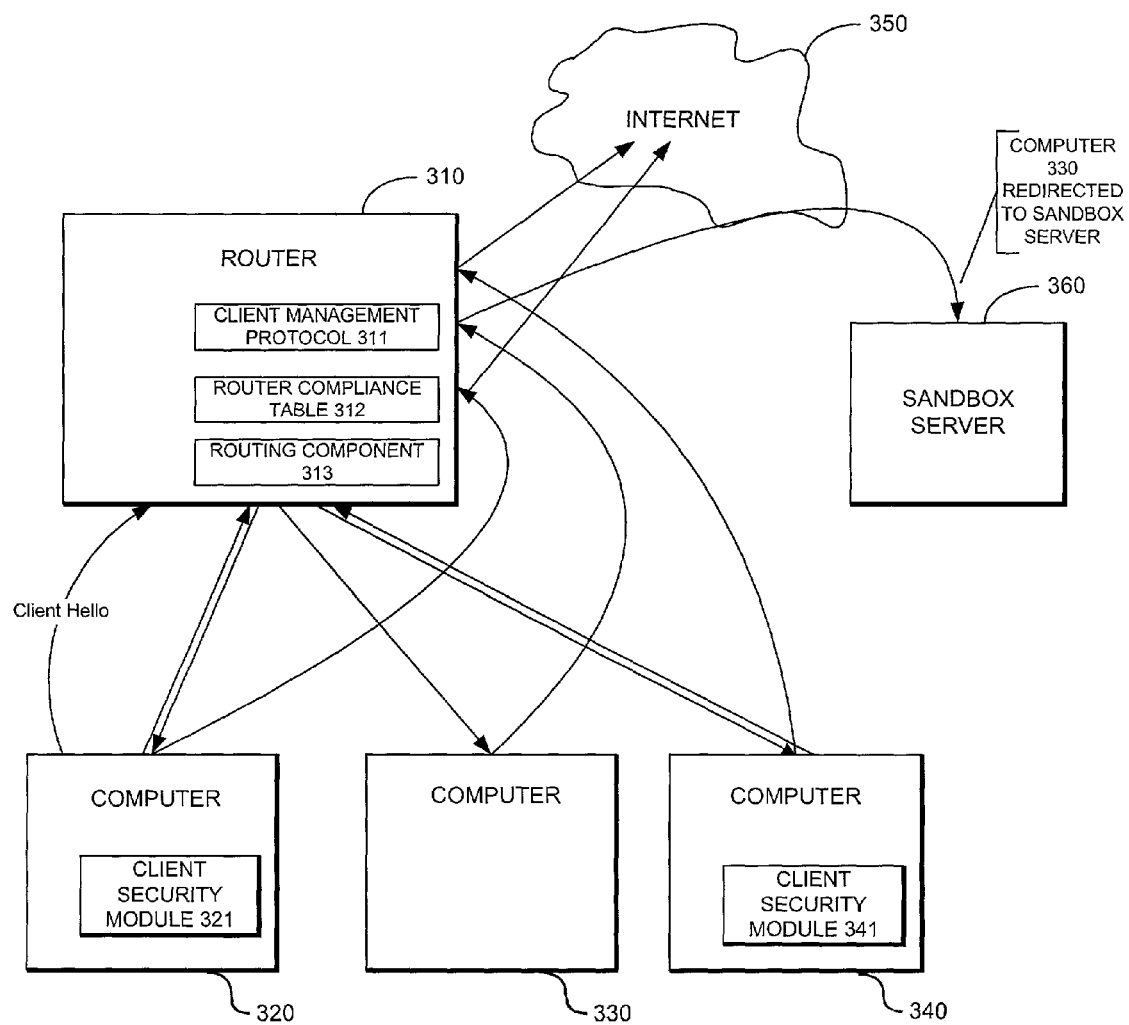
FIG. 3 is a block diagram providing an overview of Internet-based systems in which the present invention may be embodied.

FIG. 3 shows a block diagram of the system showing a router 310, such as a broadband router available from Linksys Group, Inc. of Irvine, Calif. or Cisco Systems, Inc. of San Jose, Calif., that is connected to and serving three personal computers. The router-side client management protocol (or "CMP") 311, the router compliance table 312 and the routing component 313 of the present invention are installed and operational on router 310. The three personal computers 320, 330 and 340 connect to the Internet through router 310 via DSL or cable modem or another method of transport. The client-side security module of the present invention is installed and running on computers 320 and 340 as shown at 321 and 341. The client-side security module is not installed on computer 330. The Internet is represented by the Internet cloud 350. At the right side of FIG. 3 is a sandbox server 360, which is a computer server that is located somewhere on the Internet.

Every few seconds the CMP component 311 sends out a communication via Internet broadcast to computers 320, 330 and 340 that is described as a "router challenge". This router challenge requests a response from computers 320, 330 and 340 within a few seconds. The response time requested is randomized so that each of these computers responds at a slightly different time to avoid packet collision that might occur if all three computers were asked to respond at once. Computers 320 and 340 have the client-side security module installed and are shown on FIG. 3 as responding to the router challenge. For this example deployment, computer 330 does not respond to the router challenge, as there is no client-side security module installed on this computer.

FIG. 3 also shows the (optional) transmission of a "client hello" packet by computer 320 to router 310 before it receives any router challenge. The client-side security module 321 on computer 320 sends the client hello packet to router 310 because it has previously been connected to this LAN and it recognizes the router to which it is connected. Client-side security module 321 does not wait for the router challenge, but rather initiates a proactive client hello packet to facilitate a quicker connection to the Internet. Without this proactive transmission of a hello packet, computer 320 may have to wait for a few seconds for the next router challenge before it is able to connect to the Internet. The transmission of a client hello packet is an optimization that enables quicker access to the Internet.

The responses received by router-side CMP 311 are maintained in the router compliance table 312. The router compliance table stores the responses received from each computer. Each time router 310 receives a request from computers 320, 330 or 340 to connect to the Internet, the CMP 311 reviews the router compliance table 312 and analyzes whether or not the computer requesting a connection to the Internet properly responded to the most recent router challenge. If it determines that the computer has properly responded to the router challenge, then it invokes the routing component 313 and permits the computer to connect to the Internet. In FIG. 3, computers 320 and 340 are shown to be in compliance and are permitted to connect to the Internet.

If a computer has not responded to a router challenge within the specified time frame allowed or if a computer has not answered at all, then the computer is not allowed to connect to the Internet as requested. A computer may also be precluded from connecting to the Internet if it answered the router challenge with a response that indicated it was not in compliance in some particular manner with one or more of the security policy requirements indicated in the router challenge. For example, a computer running an older version of the security software may respond in the negative to a router challenge requesting confirmation that the computer is running a current version of the software. In all of these cases, the non-compliant computer 330 is then redirected by the routing component 313 and permitted only a limited Internet connection to sandbox server 360. In this situation, the routing component 313 only allows non-compliant computer 330 to perform a defined set of tasks to address the non-compliance. All other Internet access by computer 330 is disabled.

C. Detailed Construction of the Preferred Embodiment

1. Introduction

In the currently preferred embodiment, two core modules are involved in the implementation of this invention. The first is a small footprint security enforcement module that runs on a local router (or other piece of client premises equipment) that is providing Internet access to a LAN or an individual computer. The second is a module that resides on one or more of the client computers connected to the router. The currently preferred embodiment also includes a sandbox server to which non-compliant computers are re-directed when they attempt to connect to the Internet. Each of these components is described in more detail below.

The following discussion will use the term "router" to describe the local piece of client premises equipment. However, the security module can also be installed on a cable modem or another type of client premises equipment that is serving a routing function for the LAN. Similarly, the below discussion refers to one or more personal computers on a LAN that are connected to the router. However, there are various other machines and devices that can be connected to the router and that can also benefit from the present invention. The below discussion also refers to computers connected on a LAN, but in the case of many small business and home users the present invention may be used in conjunction with routers serving a single connected computer as well as with routers serving multiple machines in a Local Area Network.

2. Router-Side Security Module

The router-side security enforcement module includes three components. The first component is called the client monitoring protocol or "CMP". The client monitoring protocol is responsible for sending out router challenges and receiving responses to these challenges from the machines and devices in the LAN. The CMP also evaluates the responses as compliant or non-compliant and takes certain actions when responses are non-compliant as described below.

As indicated above, the router-side CMP component may also (optionally) enforce other security policies in addition to requiring the local computers to be running the specified end point security module. For example, the system administrator may establish a policy requiring that a specific version of the security solution or a specific virus protection program is operational on each of these computers. The CMP would then evaluate whether or not each local computer was in compliance with the specified policy. These security policies can be customized by the local administrator as described in more detail below.

The second component is a centralized table known as the "router compliance table". Responses received by the CMP from each client machine are entered into the router compliance table. The router compliance table can be implemented on the router in several different ways. The router compliance table can be maintained as part of an Address Resolution Protocol (ARP) table. The ARP table is a table that every router maintains to match IP addresses to Ethernet addresses using the Address Resolution Protocol. Another approach is to maintain this router compliance table as part of a Network Address Translation (NAT) table on the router. The Network Address Translation table is used to match local IP addresses to external addresses. Another alternative is for the router compliance table to be a complete stand-alone table. The router compliance table can be implemented on a specific router or other piece of client premises equipment in any one of these manners.

The router compliance table lists all the computers in a subnet in one column and then lists various response values in a second column next to the corresponding computer. To simplify matters and to aid in exception handling of certain responses, all response values are listed as a double word (e.g., 32 bit unsigned integer). Certain responses (or failures to respond) are assigned a particular integer value that corresponds to the status of that client computer. Certain integer values are reserved for categorization of various responses. For example, response value 2 in this context means that the router has never received a response from that computer. As another example, response value 33 might mean that an older version of the security software is running on that computer. These response categories are documented in more detail below and can be customized to address particular requirements.

For purposes of determining compliance with applicable security policies, the CMP evaluates the value stored in the router compliance table. If the value is less than 256, then the value corresponds to a specific status based on the pre-defined categories. If the value stored in the router compliance table is 256 or more, then the value represents the time in which the response to the router challenge was returned by each computer. The CMP handles this by taking the actual time of the response returned by a computer responding to the router challenge, adding 256 to this time and entering the sum into the table. This makes exception handling more efficient as it can be easily determined that response 2 means the computer has not responded, response 33 means it is running older software and so forth. In the event the value stored in the router compliance table is 256 or more, then the CMP evaluates whether or not the response was received within the time frame required by the router challenge. In this situation, 256 is subtracted from the value stored in the router compliance table (or alternatively 256 is added to the time being compared to the stored value) and the remainder is analyzed to determine if the specified machine properly responded to the router challenge. If the actual response time exceeds the specified value, then this means that at some point the client computer stopped responding to the router challenge. This failure to respond could result from the deactivation of the client-side security module or perhaps because there is a connection problem. The deactivation of the client-side security component may result from a user intentionally disabling the component or may be caused by a Trojan horse problem on the computer.

The third component of the router-side security module is referred to as the routing component. The routing component allows the local computer to connect to the Internet if it is in compliance with established security policies. If the local computer is not in compliance with these policies, then the routing component invokes its re-routing manager. The re-routing manager operates to redirect the local computer to the sandbox server instead of the address originally requested. The operations performed by the routing component are described in more detail below.

3. Client-Side Security Module

In addition to the security module on the router, a client component of the present invention also runs on one or more local computers that connect to the Internet through the router. The client-side security module has two main functions. First the client-side security module can determine if a device is a local device connected on the same LAN. The client-side module can remember if it has previously connected to that LAN and if it has previously received a router challenge from the local router. This ability of the client-side security component to identify the local gateway provides additional security protection by enabling the local machine to only recognize router challenges that are sent from the current Internet gateway on its LAN and to ignore those sent from other devices. In other words, it enables the local computer to identify its local gateway to the Internet and only respond to router challenges from this local gateway. This ability to identify the local gateway can avoid potential denial of service and similar attacks on the local computer from other sources. This also enables the local computer to proactively send out a client hello packet to the local router that it recognizes as previously described to optimize its ability to access the Internet.

The client-side security module is able to recognize the router on the LAN as each router has a specific Media Access Control ("MAC") address. MAC addresses are equivalent to IP addresses on the Internet. Each network card and Ethernet card has a different MAC address burned into it. This MAC address provides a secondary identification in addition to the IP address assigned to the router. This secondary identification is necessary because the IP address of the router may not be unique. While all IP addresses on the Internet are unique, there is a range of other addresses that are reserved for local use and not available on the Internet. IP addresses on Local Area Networks are typically local addresses that are expressed as an address within one of the ranges not available on the Internet. These local addresses may not be unique as they may be duplicative of another local network address on another LAN. Accordingly, the client-side component looks to the unique MAC address burned into the router as a means of more accurately identifying the local router to which it is connected.

The second set of functions for this client-side security module is handling the receipt of router challenges and responding to these router challenges. This includes responding in the required time frame to basic router challenges as well as responding appropriately to any optional security requirements that are included in the router challenge.

4. Sandbox Server

When a computer is not compliant, the security solution redirects the user to the sandbox server to inform him or her of the non-compliance. The sandbox server also enables the user to take the steps necessary to bring his or her computer back into compliance. The sandbox server operates by looking for communications on certain port addresses and using the port address as a response code. The different port addresses can, in effect, indicate a certain problem or condition. For example, port 8082 means no client response was received. Other ports can be used to indicate other specific problems. This methodology is described in more detail below.

D. Preferred User Interface

1. Router

Figure 4:
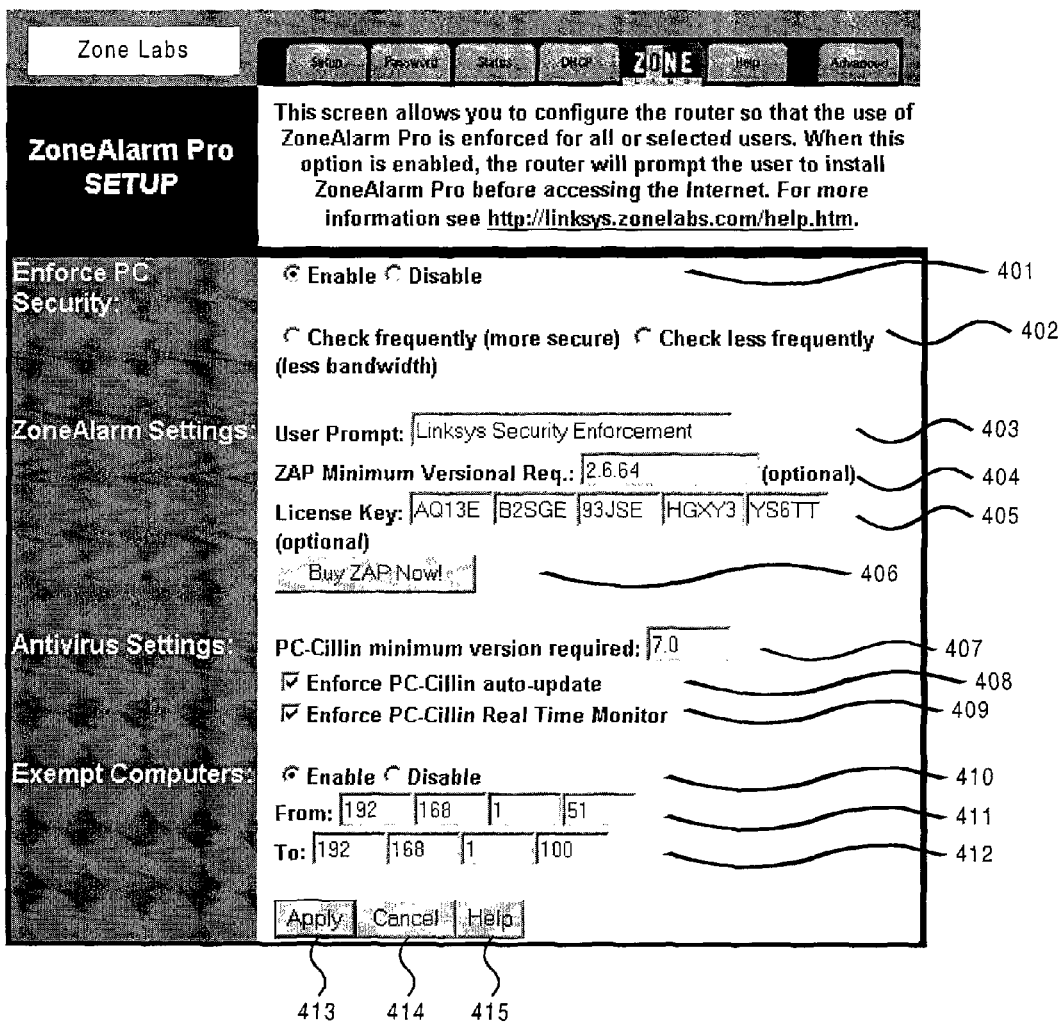
FIG. 4 is a bitmap screenshot illustrating a preferred user administration interface for configuration of the router-side security module of the present invention.

The portion of the client monitoring protocol software that is installed on the router is configurable via a preferred user administration interface 400 as shown in FIG. 4 (e.g., running on a computer connected to the network). The user administration interface 400 is a panel that has been added to the standard router setup utility that may be used to setup and configure the router for use of the security modules of the present invention. As shown in FIG. 4, the interface 400 provides a "view" of the settings governing operation of the security solution for a sample configuration on a router. In this case, the user interface 400 is shown as an HTML based interface but the user interface may alternatively be implemented in a different format. The interface can be accessed either directly or remotely through a secure session and with the supply of appropriate passwords.

As shown, the user interface 400 has the following buttons or fields. Button 401 allows the software to be enabled or disabled. Button 402 sets the frequency of router challenges. Field 403 identifies text to be shown when security is enforced. Field 404 provides for enforcement of a specific version of the security software. Field 405 provides for a license identification key. Button 406 is used to order products from the supplier. Field 407 allows the administrator to require specific anti-virus software. Buttons 408 and 409 give the administrator the option to enforce other anti-virus policies. Button 410 and fields 411 and 412 allow the administrator to exempt certain devices from the security requirements. Buttons 413 and 414 allow the administrator to apply or cancel changes. Button 415 is a help key.

Operation of interface 400 will now be described by showing how an administrator may use interface 400 to establish the security standards to be enforced by a particular router. The administrator first uses button 401 to enable or disable the security solution. If button 401 is enabled as shown on FIG. 4, the router will send out router challenges and will enforce the requirement that the computers in its LAN are operating the specified end point security solution as described above. Button 402 allows an administrator to provide for sending router challenges more frequently (which provides greater security) or less frequently. If a large number of computers were using the router, the administrator may issue router challenges less frequently to conserve bandwidth.

Fields 403, 404, 405 and Button 406 shown on FIG. 4 are examples of optional settings that may be enabled by the administrator. Field 403 shows an example of a label, in this case called "Router Security Enforcement," that identifies the text that the administrator has chosen to be shown to the user when the router enforces security. This enables the administrator to write whatever text he or she may choose to explain the security enforcement process.

Field 404 shows an example that allows the router to enforce the requirement for the client computers to run a minimum version level of the security solution of the present invention. Field 405 illustrates an example of another option to enable each installation to be identified by a unique license key. The information in field 405 together with button 406 is used to facilitate direct ordering of additional products or upgrades from the supplier. Another example of optional settings that may be enabled by the administrator is shown by field 407 and buttons 408 and 409 on FIG. 4. This is an example of using the router to enforce a requirement for a totally separate piece of software, in this case a third party anti-virus program. Field 407 indicates that the router, when enabled, enforces the requirement for each client computer to be running version 7.0 or greater of a specific anti-virus program, using the same methodology previously described. Buttons 408 and 409 are examples of options that allow the administrator to enforce other policies relating to the anti-virus software.

The settings shown on FIG. 4 are examples of the types of security policies that can be enforced using the present invention. Many other policies may also be enforced in addition to those that are shown. For example, an administrator may permit a local computer to access the Internet using Internet Explorer, but deny access to the Internet if the application on the local computer initiating the connection is a RealAudio player because of the significant bandwidth that is used by the RealAudio application.

Buttons 410 and fields 411 and 412 provide a mechanism for the administrator to exempt certain computers or devices from the established security requirements. The administrator can select enable at button 410 to exempt certain computers or devices, for example those devices that are not capable of running the end point security software. Fields 411 and 412 provide for insertion of an address range in which the computers or devices to be exempted from the security requirements may be located. As shown, button 410 and fields 411 and 412 exempt devices in the address range from 192.168.1.51 to 192.168.1.100 from the specified security requirements. Buttons 413 and 414 at the bottom of FIG. 4 enable the administrator to apply or cancel previously made changes. Button 415 is a "help" key that provides for display of additional information explaining configuration and operation of the software.

2. Policy Setting Interface

Figure 5:
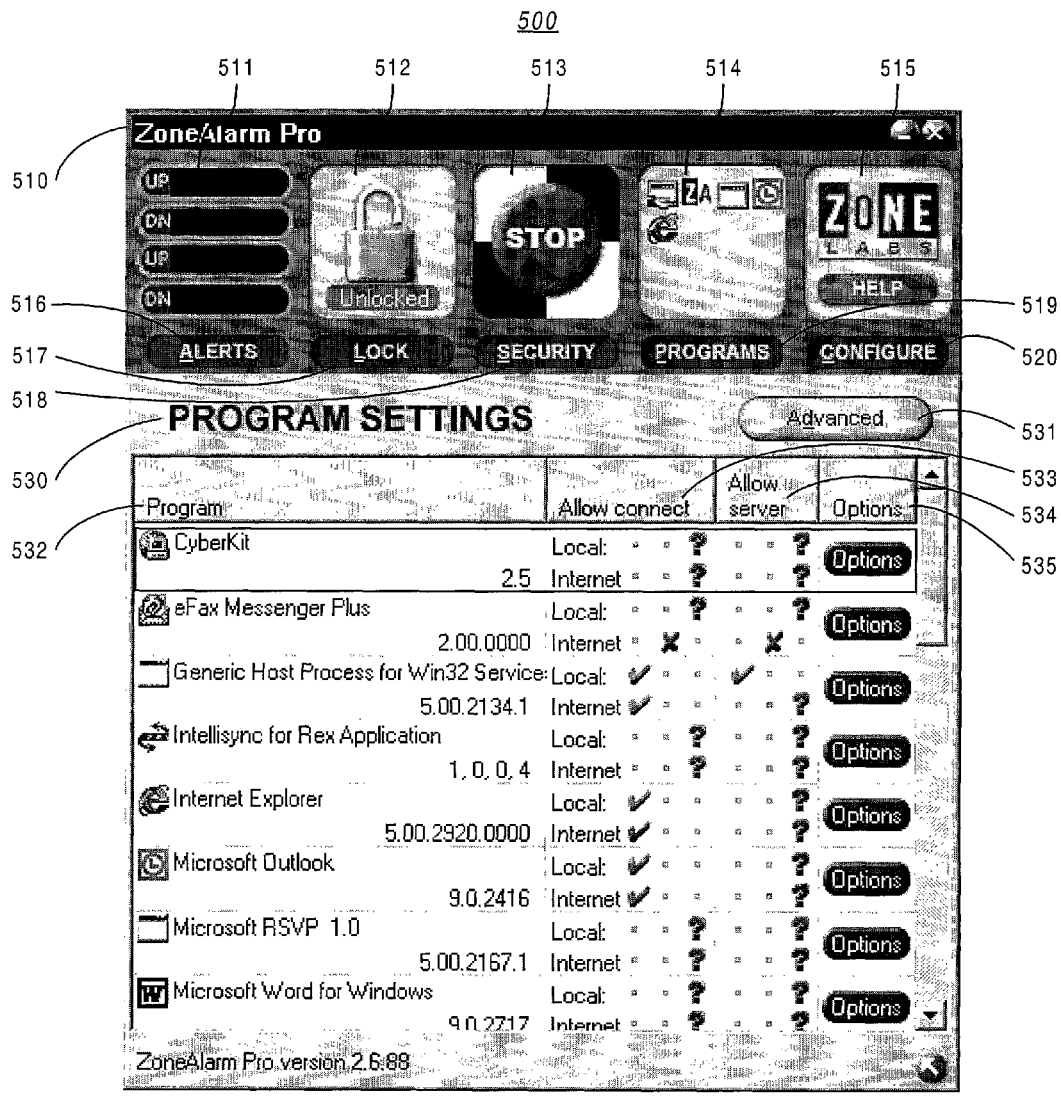
FIG. 5 is a bitmap screenshot illustrating a preferred user interface for the policy setting component of the security system of the present invention.

FIG. 5 illustrates a preferred user interface 500 for the "policy setting" component of this security system of the present invention. The present invention includes a policy setting component that runs on one or more of the client computers that connect to the router or other client premises equipment. The policy setting component gives the administrator or user the option to establish and configure various security policies to be observed and enforced by the system.

The preferred user interface panel 500 includes a toolbar 510 at the top of the panel containing buttons 511 through 520. Button 511 displays the amount of data being sent and received across the Internet. Button 512 enables an administrator or user to lock or unlock access to the Internet. As shown on FIG. 5, button 512 is unlocked, permitting the computer to access the Internet. Button 513 enables the administrator or user to immediately shut off all Internet access. Button 514 displays the programs connected to the Internet. Button 515 provides help information.

Button 516 opens a panel (not shown) that enables the administrator or user to view alerts (instances of outside attempts to access a local computer) and provides options for how such alerts are displayed and stored. Button 517 opens a panel (not shown) that enables the administrator or user to provide settings for "locking" a computer and blocking access to and from the Internet. For example, the administrator or user may provide for access to be blocked after the computer has been inactive for more than 10 minutes. Button 518 opens up a security settings panel. The security settings panel is described below and is illustrated on FIG. 6. Button 519 opens up the program settings panel which is displayed on the bottom half of FIG. 5. Button 520 opens up a configuration panel (not shown) providing additional configuration options.

The program settings panel 530 is shown on the bottom half of FIG. 5. The program settings panel allows the administrator or user to select which programs on a computer may access the Internet. Button 531 enables the administrator or user to open a panel (not shown) providing certain advanced program permission setting options. The program list column 532 lists the programs that have attempted to connect to the Internet. The allow connect column 533 enables the administrator or user to select whether or not the specified program may connect to the LAN or to the Internet. The administrator or user may use this allow connect column 533 to allow access (indicated by a check mark in this column), to deny access (indicated by an X) or to ask for specific authorization (indicated by a question mark). For example, for the first program shown in the program list column 532 named "CyberKit," the allow connect column 533 is set to ask the administrator or user for specific authorization each time the program connects to the LAN or Internet. The allow server column 534 enables the administrator or user to control which programs can perform server functions. The options column 535 provides additional options for establishing the permitted activities of each program.

A multitude of different types of policy rules can be established. For example, an administrator can establish a rule based on a particular application identity (e.g., name and version number), such as a rule preventing access by a RealAudio player application (e.g., "ra32.exe") or a rule permitting access to only administrator or user-approved applications. Similarly, an administrator can establish a rule requiring a particular application to have a verifiable digital signature. In the currently preferred embodiment, a cryptographic hash of the given application, such as a Message Digest (e.g., Secure Hash Algorithm (SHA-1) or MD5), is preferably employed as the digital signature, for preventing substitution (or other tampering) of applications. For a discussion of cryptographic hashes, including SHA-1 and MD5, see e.g., Schneier, Bruce, *Applied Cryptography*, Second Edition, John Wiley & Sons, Inc., 1996, the disclosure of which is hereby incorporated by reference. Although the basic methodology of the present invention does not require application verification, employing a cryptographic hash or Message Digest prevents tampering since it is computationally infeasible (given current and foreseeable hardware) to generate a tampered application that would hash to the same digital signature or ID. Apart from application-based rules, rules can be established on the basis of non-application activities or features. For example, rules can also be established on the basis of including and/or excluding access to particular Internet sites.

3. Security Settings Panel

Figure 6:
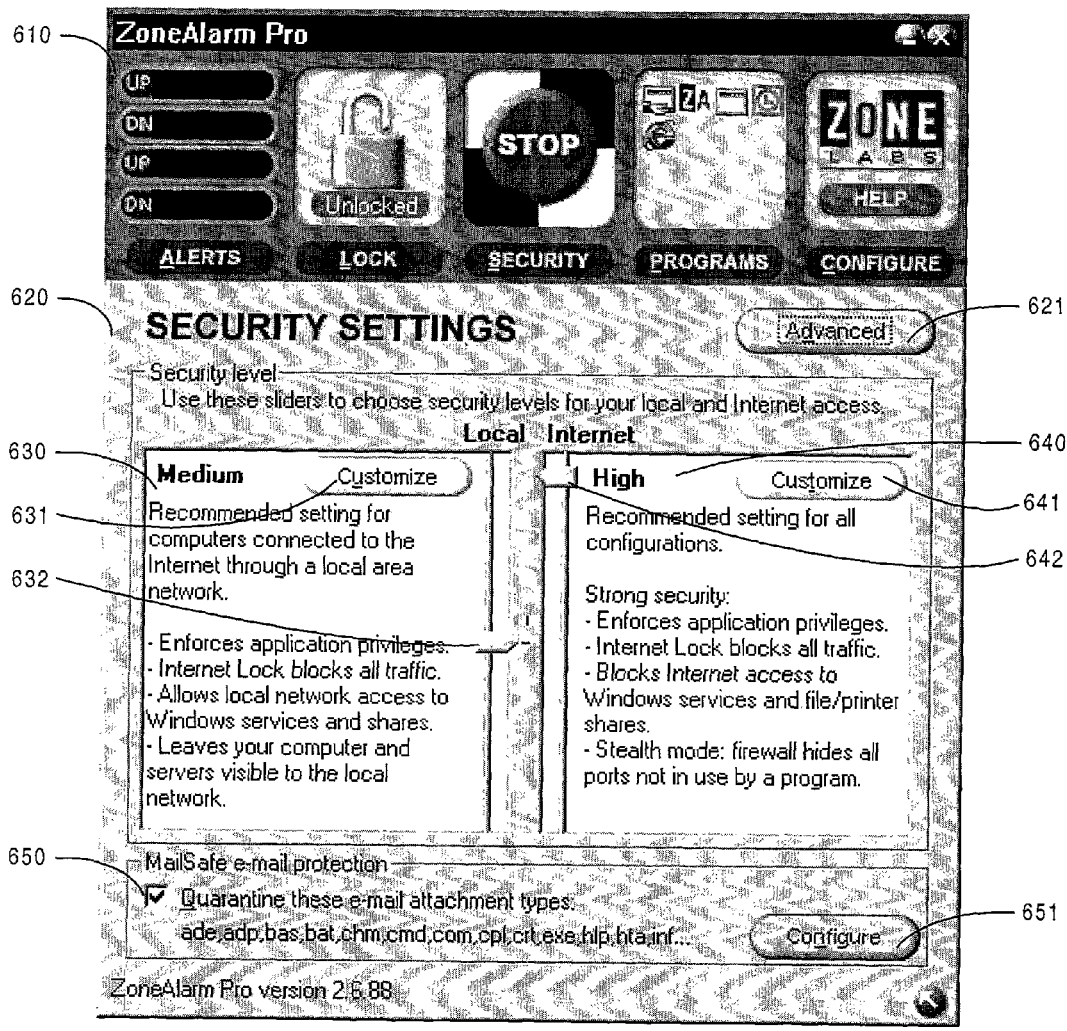
FIG. 6 is a bitmap screenshot illustrating a security settings panel of the present invention that permits the user or administrator to apply various security policies.

Another view of the preferred user interface 600 of the policy setting module of the present invention is illustrated at FIG. 6. The toolbar 610 previously described above is at the top of FIG. 6. The security settings panel 620 is at the bottom of FIG. 6. This security settings panel 620 permits the user or administrator to define two different groups or "zones" of computers and to apply different security policies to those groups. Button 621 allows the user or administrator to provide for advanced security settings. The first group is the "Local Zone" 630 of trusted computers (shown on the left side of FIG. 6). This Local Zone is defined by the user or administrator and typically consists of other computers on the LAN. All other computers that are not in the defined Local Zone are placed in the "Internet Zone" 640 (shown on the right side of FIG. 6). Buttons 631 and 641 allow the user certain additional options to customize the security settings for each of the zones. The Local Zone and the Internet Zone each have a security level selector 632 and 642, which are a slide bars that permit the user or administrator to change the security level for each zone. FIG. 6 shows the security level selector 632 for the Local Zone set to medium and the security level selector 642 for the Internet Zone set to high. This provides for a reduced level of security amongst local computers on the LAN and a higher level of security for unknown computers connected on the Internet. The MailSafe protection button 650 enables certain types of e-mail attachments to be quarantined and prevented from executing. The MailSafe protection feature operates by quarantining certain identified attachments and giving the user the opportunity to evaluate whether or not to open or run the attachment. Button 651 provides a panel for configuration of MailSafe protection.

4. Sandbox Server

Figure 7:
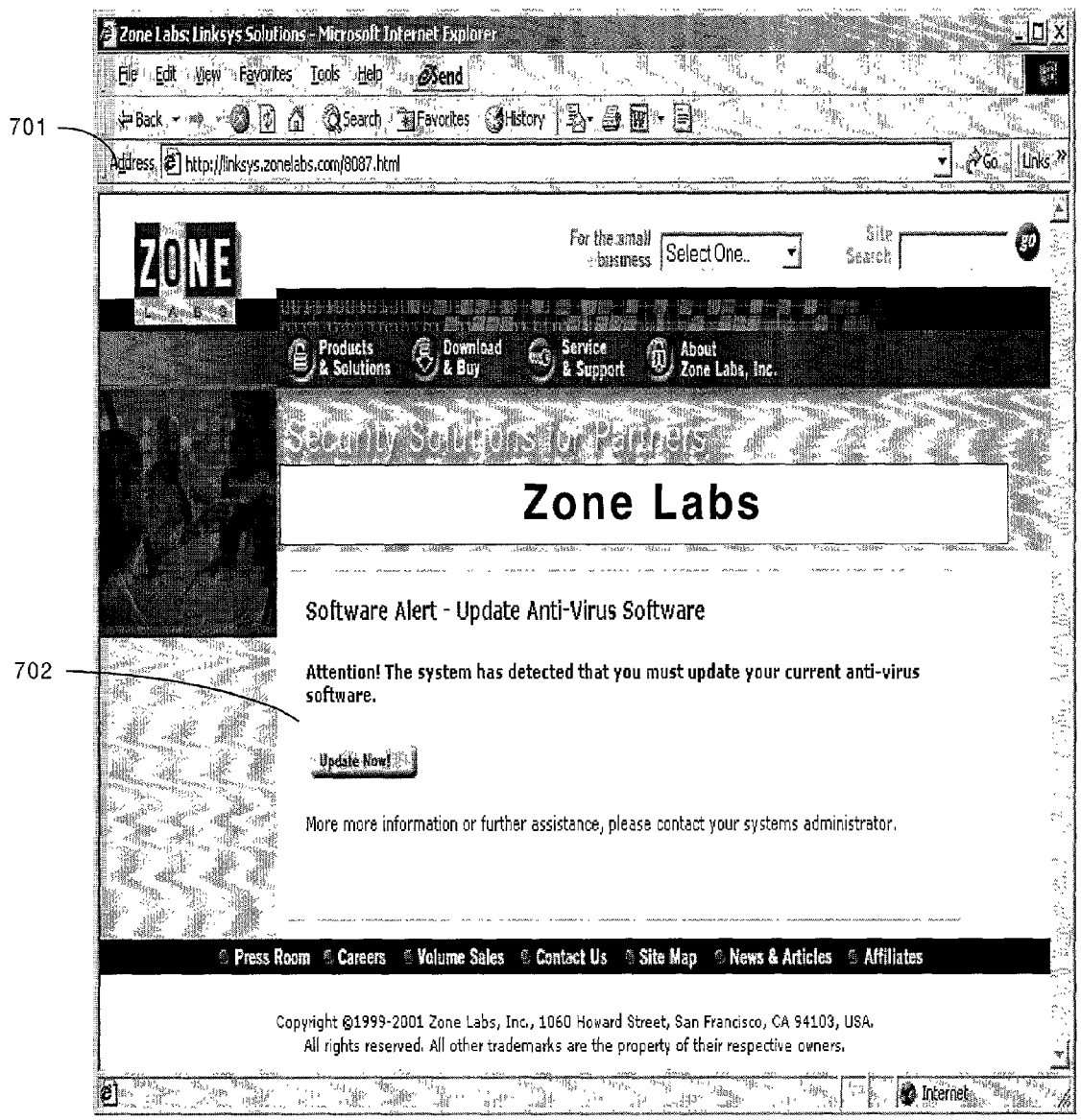
FIG. 7 is a bitmap screenshot illustrating an error message displayed by the sandbox server when a local computer does not meet a condition required by an established security policy (e.g., having current virus protection software installed).

FIG. 7 illustrates an error message window 700 that is displayed to a non-compliant client computer that is redirected to the sandbox server. Address field 701, as shown on FIG. 7, shows that the client computer is redirected by the re-routing software on the client premises equipment to port 8087 on the sandbox server. On the sandbox server port 8087 causes the sandbox server to display this window 700 to the user. The message displayed in panel 702, as shown in FIG. 7, informs the user that he or she needs to update the virus protection software installed on the computer.

The sandbox server listens for communications on a number of ports. When the sandbox server receives a packet on a particular port, the port that is used for communication signals a particular compliance problem for the client computer that is redirected. The port acts to categorize the reason for the redirection of the client computer in this fashion. Based on the port which the packet is received, the sandbox server displays an appropriate error page corresponding to the compliance problem that is detected.

Figure 8:
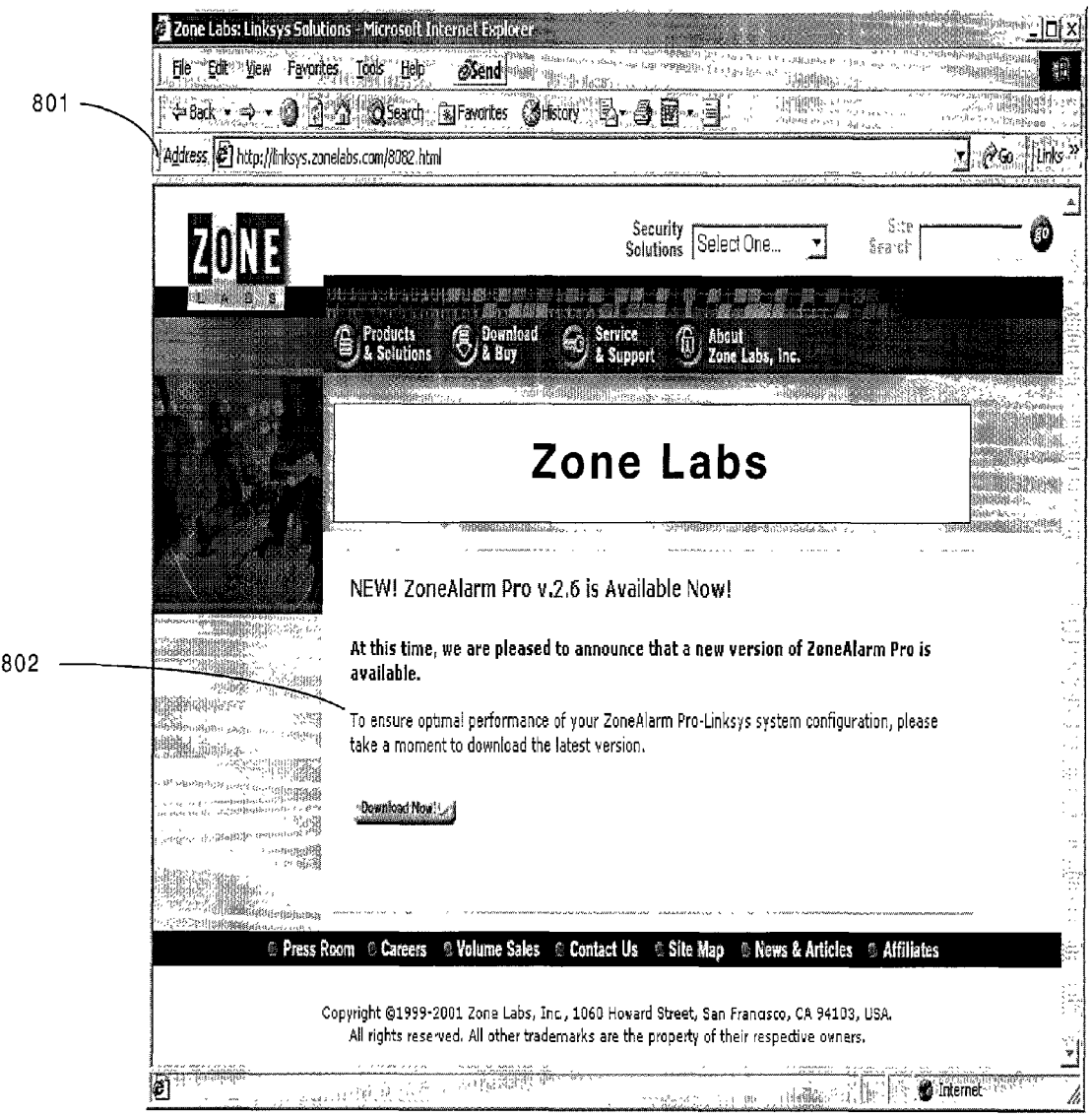
FIG. 8 is a bitmap screenshot illustrating an error message received by a client computer when it does not have current security software and is redirected to the sandbox server.

Another example of an error page displayed to a user is shown in FIG. 8. Error message window 800, as shown in FIG. 8, illustrates an error message displayed to a user that does not have current security software installed on his or her computer. Address field 801 indicates that the user message was received on port 8082. As a result, error message panel 802 is displayed to the user indicating that there is a new version of the security software available and prompting the user to download the new version.

In the current preferred implementation of the sandbox server, the server listens on various ports and responds by displaying the following different HTTP pages in response to communications on the below ports:

| Port | Content |
| --- | --- |
| 80 | General help and trouble shooting. |
| 8080 | Redirect Base Port. |
| 8081 | Client Time Out. |
| 8082 | No client response. |
| 8083-8112 | Reserved |
| 8113 | Wrong client version. Prompts user to update ZAP with new version. |
| 8114 | Invalid license key. Informs user their license key is invalid-contact administrator. |
| 8115 | Informs user that the ZAP license is insufficient for number of users-contact administrator. |
| 8116 | Anti-virus not installed. Informs user that he/she needs to download anti-virus software. |
| 8117 | Anti-virus old. Informs user to update anti-virus software. |
| 8118 | Anti-virus auto-update not enabled. Informs user to activate anti-virus Auto-Update. |
| 8119 | Anti-virus Real-Time monitoring not enabled. Informs user to activate Real-Time monitoring. |

E. Internal Operations

1. Protocols a) Client Monitoring Protocol

The client monitoring protocol (CMP) is a simple monitoring protocol that ensures that the security solution is installed on the client computer or computers and assures that these clients are running the correct version of this security solution. The CMP also enforces any additional security policies selected by the administrator.

The CMP is, to an extent, modeled on BOOTP or DHCP and it uses the UDP protocol, port 491, on both the router and on each client computer. Every packet is encrypted using the router's key and decrypted using the client computer's key or vice versa. Each packet consists of a header, body and optional additional parameters. This ensures expandability and interoperability even if the router and clients use different versions of the protocol.

Options have the following format:

| Element | Size | Comment |
| --- | --- | --- |
| Option ID | WORD | Specific to option |
| Option size | WORD | Size of this structure including data |
| Option data | | Specific to option | b) Client Hello Packet

As described above, a "client hello" packet is sent by the client computer to the router to request a router challenge. If a client computer has previously been managed by a router on which the security solution is installed, the client-side security component will remember the IP address and MAC address of that router. The next time the client computer starts up and encounters the same LAN, the client-side security component will proactively let the router know that it needs a router challenge by sending a client hello packet. This reduces the access time to the Internet at client startup. The structure of the client hello packet is as follows:

| Element | Size | Comment |
| --- | --- | --- |
| Packet ID | WORD | CLIENT_HELLO (= = 1) |
| Packet size | WORD | Size of this structure + options |
| Protocol version | WORD | PROTOCOL_VERSION (= = 1) |
| Packet options | WORD | Number of options following this structure |
| Packet CRC | DWORD | Checksum for the packet |
| Sender IP address | DWORD | In network byte order-prevents spoofing |
| Sender Product ID | DWORD | Assigned by ZL (= 0x80000001 for ZAP) |
| Sender version | DWORD + DWORD | Actual ZAP version |
| Reserved Options | DWORD | Reserved | c) Router Challenge

The router-side security module sends a router challenge packet to either an individual client computer or to all client computers expecting a response to permit Internet access. When security enforcement is enabled, the router broadcasts a packet on the LAN side to the local broadcast address (IP address ||(^IP Mask), UDP port 491) every N seconds, as determined by the monitoring frequency setting established by the administrator. The first broadcast packet is sent as soon as possible after the router's boot. The router challenge packet is also sent to an individual client computer as a response to a client hello packet. The router challenge packet is encrypted by the router's public key. It is decrypted by the client computer using the client's private key. The router challenge packet has a fixed header and it has additional parameters that can be selected as options as previously described. The basic router challenge packet has the following structure:

| Element | Size | Comment |
| --- | --- | --- |
| Packet ID | WORD | ROUTER_CHALLENGE (= = 2) |
| Packet size | WORD | Size of this structure + options |
| Protocol version | WORD | PROTOCOL_VERSION (= = 1) |
| Packet options | WORD | Number of options following this structure |
| Packet CRC | DWORD | Checksum for the packet |
| Sender IP address | DWORD | In network byte order-prevents spoofing |
| Sender Product ID | DWORD | Assigned by ZL (= 0x00000001 for Linksys router) |
| Sender version | DWORD + DWORD | Linksys router version |
| Router Session ID | DWORD | Per router session generated random value |
| Response time | DWORD | Time in seconds in which the router expects a response. |
| Timestamp | DWORD | Packet Timestamp |
| Reserved Options | DWORD | |

The "client version" option allows the administrator or the router to require that a specific minimum version of the security solution be installed on the client computer. An example of this packet structure is as follows:

| Element | Size | Comment |
| --- | --- | --- |
| Option ID | WORD | OPTION_CLIENT_VERSION (= = 1) |
| Option size | WORD | 16 |
| Product ID | DWORD | Assigned by ZL, 0x80000001 for ZAP |
| Product version | 4xWORD | Minimum acceptable product version |

The "license" option allows the administrator to use the router for automatic distribution of a license key that is automatically installed on the client machine. An example is as follows:

| Element | Size | Comment |
| --- | --- | --- |
| Option ID | WORD | OPTION_ZL_LICENSE (= = 2) |
| Option size | WORD | 34 |
| ZAP License key | CHAR[28] | Set by admin, concatenated to a single string |
| Number of users | WORD | Contains the number of ZAP licenses, that are currently issued by the router |

In the currently preferred embodiment, the router is responsible for maintaining the number-of-users count (i.e., current license count).

The "user prompt" option allows the administrator to use the router for automatic distribution of a user prompt that will be displayed in the user interface on the client computer. This packet has the following structure:

| Element | Size | Comment |
| --- | --- | --- |
| Option ID | WORD | OPTION_USER_PROMPT (= = 3) |
| Option size | WORD | 64 |
| User prompt | CHAR[60] | String to display to user in ZAP |

The "anti-virus challenge" option allows the administrator to use the router for anti-virus enforcement and distribution. The router-side security module looks for the appropriate code to verify if the anti-virus program is running on the client machine and if both the anti-virus program and the associated data file are up to date. An example is as follows:

| Element | Size | Comment |
| --- | --- | --- |
| Option ID | WORD | ANTI_VIRUS_CHALLENGE (= = 4) |
| Option size | WORD | 32 |
| Antivirus Product ID | DWORD | Code to identify AntiVirus name (TRENDMICRO = = 1) |
| Antivirus version | 4xWORD | Optional: CMPVERS "7.0.0" |
| Antivirus Auto-Update Enforcement | BOOL | Optional: Boolean to identify if the Auto-Update enforcement option is selected |
| Antivirus Real-Time Monitoring Enforcement | BOOL | Optional: Boolean to identify if the Real-Time Monitor enforcement option is selected |
| Antivirus Reserved1 | DWORD | Reserved |
| Antivirus Reserved2 | DWORD | Reserved | d) Client Response Packet

The client response packet is sent by a client computer to the router as a response to the router challenge. The router-side security module then decrypts, verifies and interprets each client response and stores the result in its router compliance table. The client response packet has the following structure:

| Element | Size | Comment |
| --- | --- | --- |
| Packet ID | WORD | CLIENT_RESPONSE (= = 3) |
| Packet size | WORD | Size of this structure + options |
| Protocol version | WORD | PROTOCOL_VERSION (= = 1) |
| Packet options | WORD | Number of options following this structure |
| Packet CRC | DWORD | Checksum for the packet |
| Sender IP address | DWORD | In network byte order-prevents spoofing |
| Sender Product ID | DWORD | Assigned by ZL (= 0x80000001 for ZAP) |
| Sender version | DWORD + DWORD | ZAP version |
| Router Session ID | DWORD | Copied from router challenge |
| Challenge Timestamp | DWORD | Timestamp copied from router challenge packet. |
| Status | DWORD | Client Status |
| Reserved Options | DWORD | Reserved (= = 0) | e) Router Processing Utilities

The router-side security module performs several short functions, including encrypting packets, decrypting packets, creating router challenges, analyzing decrypted packets and deciding whether to allow a computer to access the Internet or to instead re-route the client computer to the sandbox server. Each of these functions is described below.

The encrypt packet function (CMPEncryptPacket) is defined as follows:

| Element | Size | Comment |
| --- | --- | --- |
| Input buffer | UCHAR * | The buffer that contains the packet to be encrypted. |
| Output buffer | UCHAR * | The buffer that contains the encrypted packet. |
| Buffer length | DWORD | The length of the of the output buffer |

The decrypt packet function (CMPDecryptPacket) is defined as follows:

| Element | Size | Comment |
| --- | --- | --- |
| Input buffer | UCHAR * | The buffer that contains the packet to be decrypted. |
| Output buffer | UCHAR * | The buffer that contains the decrypted packet. |
| Buffer length | DWORD | The length of the of the output buffer |

The create router challenge packet function (CMPCreateChallengePacket) is defined as follows:

| Element | Size | Comment |
| --- | --- | --- |
| Input buffer | UCHAR * | The buffer that contains the packet to be decrypted. |
| Output buffer | UCHAR * | The buffer that contains the decrypted packet. |
| Buffer length | DWORD | The length of the of the output buffer |

The analyze decrypted packet function (CMPAnalyzeDecryptedPacket) is defined as follows:

| Element | Size | Comment |
| --- | --- | --- |
| Input buffer | UCHAR * | The buffer that contains the decrypted packet to be analyzed. |
| Client Table buffer | UCHAR * | The buffer that contains the client state table. |

The analyze decrypted packet function will determine if the package is a client response packet (as described above) or a client hello packet (as described above) and will process the packet accordingly (see the "Client Response Interpretation" section below).

The authorize traffic function (CMPAuthorizeTraffic) is the function that will determine whether or not to pass an Internet request. It is defined as follows:

| Element | Size | Comment |
| --- | --- | --- |
| IP Address | DWORD | The IP Address requesting Internet access. |
| Client Table Buffer | UCHAR * | The buffer that contains the client state table. | f) Client Response Interpretation.

The routine that verifies and interprets the client response packet returns a DWORD. Unless the result is "Packet invalid" the result is stored in the router compliance table. The value stored is interpreted as follows:

| Response | Value | Comment |
| --- | --- | --- |
| Client time out | 1 | No recent valid client response. |
| No client response | 2 | No client response ever received. |
| Reserved | 3-32 | Reserved. |
| ZAP version outdated | 33 | Client application incorrect or old. |
| Invalid license | 34 | Invalid license key, contact administrator. |
| License exceeded | 35 | Max users exceeded for license - contact administrator. |
| No Antivirus program installed | 36 | AV not installed. |
| Antivirus wrong version | 37 | AVold version. |
| Antivirus Auto-Update not configured | 38 | AV Auto-Update is not configured. |
| Antivirus Real-Time Monitor not running | 39 | AV Real-Time Monitor not running on client |
| Packet time stamp | >256 | Current time stamp in seconds + 256 |

The router compliance table in which these values are stored may be implemented as an extension of the existing NAT or ARP table on the router or it can be implemented as a separate and independent table. Every time a client computer attempts a connection with the Internet, the router-side security module will look up the value in the router response table and verify that the client has Internet access before it applies the NAT-related IP header changes and permits Internet access.

2. Summary of Operation

Figure 9:
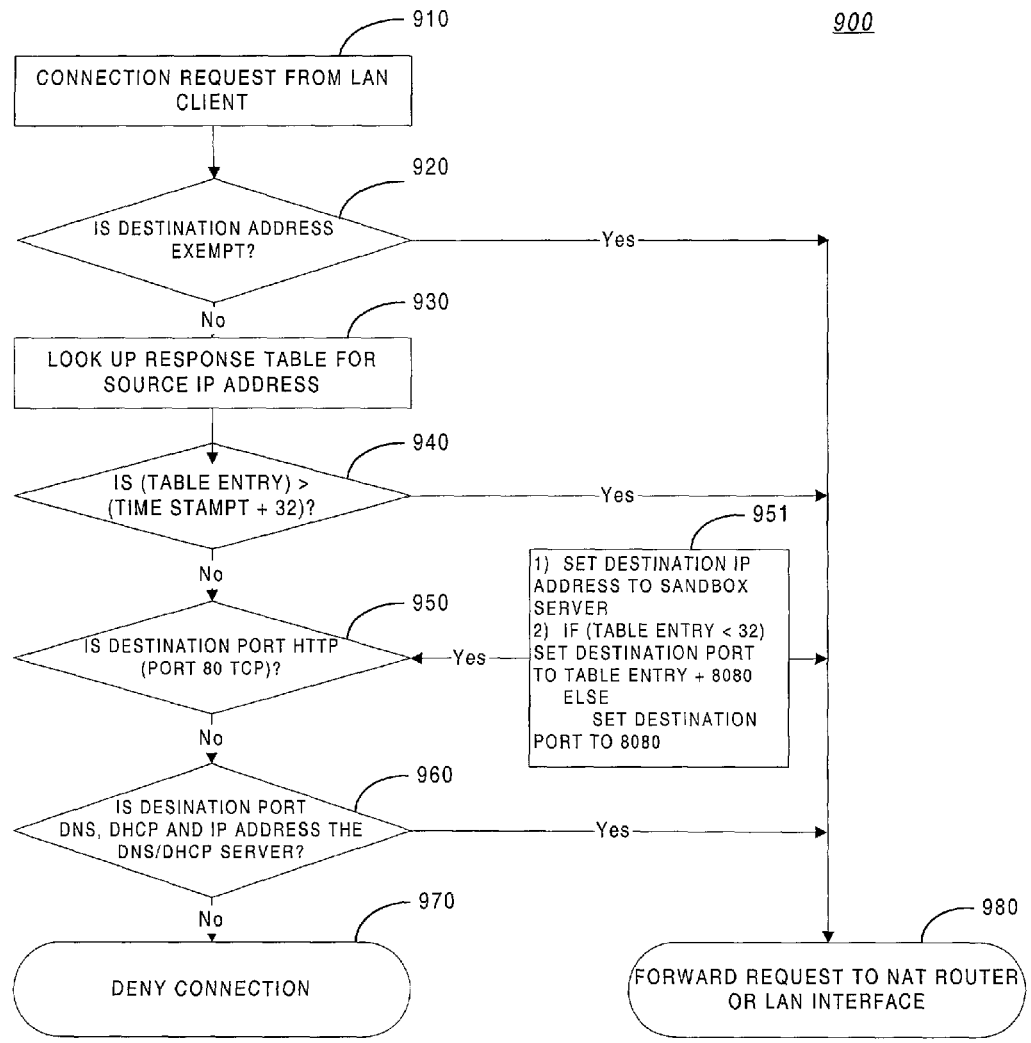
FIG. 9 is a flow diagram showing the decision making process of the router-side security module of the present invention when it receives a request to connect to the Internet from a local computer.

The flow diagram illustrated in FIG. 9 shows a method 900 of operation for the router-side security module of the present invention when the router receives a request for connection to the Internet from a local computer. In step 910, a connection attempt from one of the local computers to the Internet is received by the router. In step 920, the CMP component of the security module determines whether or not the source address is exempt. If the source address of a particular client indicates that the client is exempt from security requirements, then the client computer is allowed to connect to the Internet. If the address is not exempt, then in step 930 the CMP looks up the router compliance table entry under the client computer source IP address. In step 940, the CMP evaluates the response in the router compliance table as previously described.

If the table entry is compliant then the client computer is permitted to access the Internet. If not, then the routing component proceeds to step 950. In step 950 the routing component determines whether or not the destination port is HTTP (port 80 TCP). If the destination port is HTTP, then the re-routing manager proceeds in step 951 to manipulate the destination IP address and port. Alternatively, the re-routing manager in step 950 evaluates whether or not it was another protocol (besides HTTP) that was supported by the sandbox server. Although in the current preferred embodiment of the invention, the port that is being redirected is port 80 (which is HTTP), other alternatives are certainly feasible. For example, it is possible to have a sandbox for e-mail that sends the client attempting to send e-mail a return e-mail message informing him or her that access to e-mail is disabled and instructs him or her what to do in order to restore e-mail access.

In step 951 the destination IP address is replaced with the IP address of the sandbox server ("lynksys.zonelabs.com" in this example). Also in step 951, if the entry in the router compliance table is less than 256, then the destination port is set to the value of the table entry plus 8080. For example if the table entry is 1, the destination port is set to port 8081 (which represents 8080 plus 1). This also conveys information to the sandbox server in the HTTP header permitting the sandbox server to categorize the reason for non-compliance. Using this information, the sandbox server then displays a page with information enabling the client to address the specific problem that was detected. An alternative approach that can also be used is to redirect the client to the sandbox server for a warning that he or she was not running the required security software, but then permit the client at his or her option to continue (notwithstanding the warning) and connect to the original destination if he or she elected to do so. Otherwise, in step 951 if the entry is 256 or greater, the destination port is set to port 8080. In this manner, the connection request from a non-compliant client computer is patched and manipulated to reroute this packet to the sandbox server.

If in step 950 the destination port was not HTTP, then the re-routing manager proceeds to step 960 to evaluate whether or not the destination port was DNS or DHCP and the destination IP address that of the DNS/DHCP server. The reason for this is that even a non-compliant computer needs to be able to communicate with a DHCP server to do a DHCP lookup to obtain an IP address. Similarly, the client computer also needs to able to communicate with the DNS server regardless of whether or not compliant. If the client computer were not permitted to access the DNS server, the browser would fail prior to being redirected to the sandbox server because it could not lookup the IP address of the sandbox server. Accordingly, if the destination port and address were the DNS or DHCP servers, the client computer is permitted to connect to the server. If the destination is not port DNS or DHCP or if the destination address is not the DNS or DHCP server, then the connection is denied.

Finally, as shown at step 970 in FIG. 9, the connection to the Internet is denied in the event that the destination address is determined at step 960 not to be the DNS or DHCP server. As illustrated at step 980, a client request for connection is forwarded to the NAT router or LAN interface to connect to the Internet, as described above. After the client shuts down, the client may (optionally) issue a "client goodbye" message to the router. In response, the router updates its table. Future access from that client's IP address is blocked until such time, if any, that the IP address is revalidated (e.g., by successful challenge response from a client).

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. In a system comprising one or more client computers connected to the Internet by client premises equipment serving a routing function for client computers, a method for managing Internet access based on a specified access policy, the method comprising:

transmitting a plurality of challenges over a period of time from said client premises equipment to each client computer, for determining whether a given client computer remains in compliance with said specified access policy during said period of time;

transmitting a response from at least one client computer back to said client premises equipment for responding to each of said challenges that has been issued; and blocking Internet access for any client computer that does not respond appropriately to any challenge issued to it, wherein said access policy specifies applications that are allowed Internet access and wherein said applications are specified by executable name and version number that are acceptable.

2. The method of claim 1, wherein a client computer that does not respond at all is blocked from Internet access.

3. The method of claim 1, wherein a client computer that responds with a particular predefined code indicating non-compliance is blocked from Internet access.

4. The method of claim 1, wherein a client computer that responds with a particular predefined code indicating compliance is permitted Internet access.

5. The method of claim 1, further comprising:

before receipt of a challenge, transmitting an initial message from a particular client computer to the client premises equipment, for requesting the client premises equipment to transmit a challenge to that particular client computer.

6. The method of claim 5, wherein said initial message comprises a "client hello" packet.

7. The method of claim 1, wherein said client premises equipment is capable of permitting Internet access by selected client computers and denying access to other client computers.

8. The method of claim 1, wherein said access policy specifies rules that govern Internet access by the client computers.

9. The method of claim 8, wherein said step of blocking Internet access includes:
determining whether permitting Internet access for a given client computer would violate any of said rules, and
if permitting such Internet access would violate any of said rules, denying Internet access for that client computer.

10. The method of claim 1, wherein said access policy includes rules that are enforced against selected ones of users, computers, and groups thereof.

11. The method of claim 1, wherein said access policy specifies which applications are allowed Internet access.

12. The method of claim 1, wherein said applications are specified by digital signatures that are acceptable.

13. The method of claim 12, wherein said digital signatures are computed using a cryptographic hash.

14. The method of claim 13, wherein said cryptographic hash comprises a selected one of Secure Hash Algorithm (SHA-1) and MD5 cryptographic hashes.

15. The method of claim 1, wherein said access policy specifies Internet access activities that are permitted or restricted for applications or versions thereof.

16. The method of claim 1, wherein said access policy specifies rules that are transmitted to client computers from a remote location.

17. The method of claim 16 wherein said remote location comprises a centralized location for maintaining said access policy.

18. The method of claim 1, wherein said step of blocking Internet access includes:
determining, based on identification of a particular client computer or group thereof, a specific subset of rules filtered for that particular client computer or group thereof.

19. The method of claim 1, wherein said challenge includes a request for a particular client computer to respond as to whether it is in compliance with said access policy.

20. The method of claim 1, further comprising:
redirecting a client computer that is not in compliance with said access policy to a sandbox server; and
informing such client computer that it is not in compliance with said access policy.

21. The method of claim 20 further comprising:
redirecting a client computer that is not in compliance with a particular access policy, to a particular port on the sandbox server; and
displaying particular error message pages on the sandbox server in response to communications on particular ports.

22. In a system comprising one or more client computers connected to the Internet by client premises equipment serving a routing function for client computers, a method for managing Internet access based on a specified access policy, the method comprising:
transmitting a plurality of challenges over a period of time from said client premises equipment to each client computer, for determining whether a given client computer is in compliance with said specified access policy during said period of time;
transmitting a response from at least one client computer back to said client premises equipment for responding to said challenge that has been issued; and
redirecting a request for Internet access by any client computer that does not respond appropriately to any challenge issued to it to a sandbox server,
wherein said access policy specifies executable names and version number of applications that are allowed Internet access.

23. The method of claim 22, further comprising:
displaying an error message on the sandbox server to any client computer that does not respond appropriately to said challenge.

24. The method of claim 23, further comprising:
after display of such error message, permitting said client computer to elect to access the Internet.

25. The method of claim 22, wherein a client computer that responds with a particular predefined code indicating non-compliance is redirected to said sandbox server.

26. The method of claim 22, wherein a client computer that responds with a particular predefined code indicating compliance is permitted Internet access.

27. The method of claim 22, further comprising:
before receipt of a challenge, transmitting an initial message from a particular client computer to the client premises equipment, for requesting the client premises equipment to transmit a challenge to that particular client computer.

28. The method of claim 27, wherein said initial message comprises a "client hello" packet.

29. The method of claim 22, wherein said client premises equipment is capable of permitting Internet access by selected client computers and redirecting other client computers to the sandbox server.

30. The method of claim 22, wherein said access policy includes rules that are enforced against selected ones of users, computers, and groups thereof.

31. The method of claim 22, wherein said access policy specifies which applications are allowed Internet access.

32. The method of claim 22, wherein said access policy specifies Internet access activities that are permitted or restricted for applications or versions thereof.

33. The method of claim 22, wherein said access policy specifies rules that are transmitted to client computers from a remote location.

34. The method of claim 33, wherein said remote location comprises a centralized location for maintaining said access policy.

35. The method of claim 22, wherein said step of redirecting a request for Internet access by a client computer includes:
determining, based on identification of a particular client computer or group thereof, a specific subset of rules filtered for that particular client computer or group thereof.

36. The method of claim 22, wherein said challenge includes a request for a particular client computer to respond as to whether it is in compliance with said access policy.

37. The method of claim 22, further comprising:
redirecting a client computer that is not in compliance with a particular access policy, to a particular port on the sandbox server; and
displaying particular error messages on the sandbox server in response to communications on particular ports.

38. The method of claim 22, further comprising:
permitting client computers that are not in compliance with particular access policies to elect to access the Internet; and
blocking computers that are not in compliance with other access policies from accessing the Internet.

39. The method of claim 22, wherein said access policy specifies which applications are allowed Internet access, and wherein said applications are specified by digital signatures which are acceptable.

40. The method of claim 39, wherein said digital signatures are computed using a cryptographic hash.

41. The method of claim 40, wherein said cryptographic hash comprises a selected one of Secure Hash Algorithm (SHA-1) and MD5 cryptographic hashes.

42. A system for regulating Internet access by client computers comprising:
   an access policy governing Internet access by said client computers;
   client premises equipment serving a routing function for each client computer to be regulated and capable of issuing a plurality of challenges over a period of time to each client computer, for determining whether a given client computer is in compliance with said access policy during said period of time;
   one or more client computers which can connect to the Internet and at least one of which can respond to challenges issued by said client premises equipment; and
   an enforcement module for selectively blocking Internet access to the Internet for any client computers that fail to respond in a manner that would establish that they are in compliance with said access policy,
   wherein said access policy specifies applications that are allowed Internet access and wherein said applications are specified by executable name and version number that are acceptable.

43. The system of claim 42, wherein said client premises equipment includes a router.

44. The system of claim 42, wherein said access policy is provided at each client computer to be regulated.

45. The system of claim 42, wherein said enforcement module is provided at said client premises equipment.

46. The system of claim 42, wherein said at least one client computer which can respond to challenges responds with a particular predefined code indicating noncompliance with said access policy and is blocked from Internet access.

47. The system of claim 42, wherein a client computer that responds with a particular predefined code indicating compliance with said access policy is permitted Internet access.

48. The system of claim 42, wherein at least one of the client computer is capable of transmitting an initial message to the client premises equipment before receipt of a challenge, for requesting the client premises equipment to transmit a challenge to that particular client computer.

49. The system of claim 42, wherein said enforcement module is capable of permitting Internet access by selected client computers and denying access to other client computers.

50. The system of claim 42, wherein said access policy includes rules that are enforced against selected ones of users, computers, and groups thereof.

51. The system of claim 50, wherein said enforcement module is capable of determining, based on identification of a particular client computer or group thereof, a specific subset of said access policies filtered for that particular client computer or group thereof.

52. The system of claim 42, wherein said access policy specifies types of activities which applications are allowed to perform or restricted from performing.

53. The system of claim 42, wherein said applications are specified by digital signatures that are acceptable.

54. The system of claim 53, wherein said digital signatures are computed using a cryptographic hash.

55. The system of claim 54, wherein said cryptographic hash comprises a selected one of Secure Hash Algorithm (SHA-1) and MD5 cryptographic hashes.

56. The system of claim 42, further comprising:
   a sandbox server to which client computers that are not in compliance with said access policy are redirected.

57. The system of claim 56, wherein said sandbox server informs non-compliant client computers that they are not in compliance with said access policy.

58. The system of claim 57, wherein said client computers client computers may elect to access the Internet after being informed that they are not in compliance with said access policy.

59. The system of claim 56, wherein:
   said enforcement module is capable of redirecting a client computer that is not in compliance with a particular access policy to a particular port on the sandbox server; and
   said sandbox server is capable of displaying particular error message pages in response to communications on particular ports.

* * * * *